United States Patent
Xu et al.

(10) Patent No.: US 12,323,600 B2
(45) Date of Patent: Jun. 3, 2025

(54) RESOURCE CONSTRAINED VIDEO ENCODING

(71) Applicant: Lemon Inc.

(72) Inventors: Jizheng Xu, Los Angeles, CA (US); Weijia Zhu, Los Angeles, CA (US); Li Zhang, Los Angeles, CA (US)

(73) Assignee: LEMON INC., Grand Cayman (KY)

(*) Notice: Subject to any disclaimer, the term of this patent is extended or adjusted under 35 U.S.C. 154(b) by 0 days.

(21) Appl. No.: 17/198,194

(22) Filed: Mar. 10, 2021

(65) Prior Publication Data

US 2022/0295075 A1    Sep. 15, 2022

(51) Int. Cl.
*H04N 19/156* (2014.01)
*H04L 65/70* (2022.01)
*H04N 19/513* (2014.01)

(52) U.S. Cl.
CPC ........... *H04N 19/156* (2014.11); *H04L 65/70* (2022.05); *H04N 19/513* (2014.11)

(58) Field of Classification Search
CPC ... H04N 19/156; H04N 19/513; H04L 65/607
See application file for complete search history.

(56) References Cited

U.S. PATENT DOCUMENTS

| | | | | |
|---|---|---|---|---|
| 2008/0165861 A1* | 7/2008 | Wen | ...................... | H04N 19/132 |
| | | | | 375/240.26 |
| 2013/0336407 A1* | 12/2013 | Chen | .................... | H04N 19/513 |
| | | | | 375/240.16 |
| 2014/0307789 A1* | 10/2014 | Kim | ...................... | H04N 19/513 |
| | | | | 375/240.12 |
| 2017/0099498 A1* | 4/2017 | Sharman | ................ | H04N 19/57 |
| 2017/0272755 A1* | 9/2017 | Holcomb | ............. | H04N 19/146 |
| 2017/0289566 A1* | 10/2017 | He | .......... | H04N 19/52 |
| 2018/0242015 A1* | 8/2018 | Katsavounidis | ..... | H04N 19/124 |
| 2019/0052877 A1* | 2/2019 | Zhang | .................... | H04N 19/82 |
| 2019/0273921 A1* | 9/2019 | Abe | ...................... | H04N 19/176 |
| 2022/0094961 A1* | 3/2022 | Bae | ...................... | H04N 19/149 |
| 2022/0109835 A1* | 4/2022 | Lee | ......................... | H04N 19/54 |
| 2022/0124322 A1* | 4/2022 | Lee | ..................... | H04N 19/119 |

* cited by examiner

*Primary Examiner* — Mohammed S Rahaman
(74) *Attorney, Agent, or Firm* — Astute IP Law Group

(57) ABSTRACT

Example implementations include a method for video processing, comprising performing a conversion between a current video unit of a video and a bitstream of the video according to a rule, wherein the rule specifies performing the conversion based on a predefined bitstream.

17 Claims, 14 Drawing Sheets

1400

1402

Performing a conversion between a current video unit of a video and a bitstream of the video according to a rule, wherein the rule specifies performing the conversion based on a predefined bitstream

FIG. 14

RESOURCE CONSTRAINED VIDEO ENCODING

BACKGROUND

The present disclosure relates generally to video coding, and more particularly, to video processing in constrained resource contexts.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of video processing, comprising performing a conversion between a current video unit of a video and a bitstream of the video according to a rule; wherein the rule specifies performing the conversion based on a constrained resource context.

The disclosure also provides an apparatus for processing video data comprising a processor and a non-transitory memory with instructions thereon, wherein the instructions upon execution by the processor, cause the processor to perform a conversion between a current video unit of a video and a bitstream of the video according to a rule; wherein the rule specifies to performing the conversion based on a constrained resource context.

The disclosure also provides a non-transitory computer-readable storage medium storing instructions that cause a processor to: perform a conversion between a current video unit of a video and a bitstream of the video according to a rule; wherein the rule specifies to performing the conversion based on a constrained resource context.

The disclosure also provides a non-transitory computer-readable recording medium storing a bitstream of a video which is generated by a method performed by a video processing apparatus, wherein the method comprises: generating the bitstream of the video based on a current video unit of the video according to a rule; wherein the rule specifies to generating the bitstream based on a constrained resource context.

To the accomplishment of the foregoing and related ends, the one or more aspects include the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 14 is a flowchart of an example method of resource constrained video processing in accordance with some aspects of the present disclosure.

DETAILED DESCRIPTION

Figure 1:
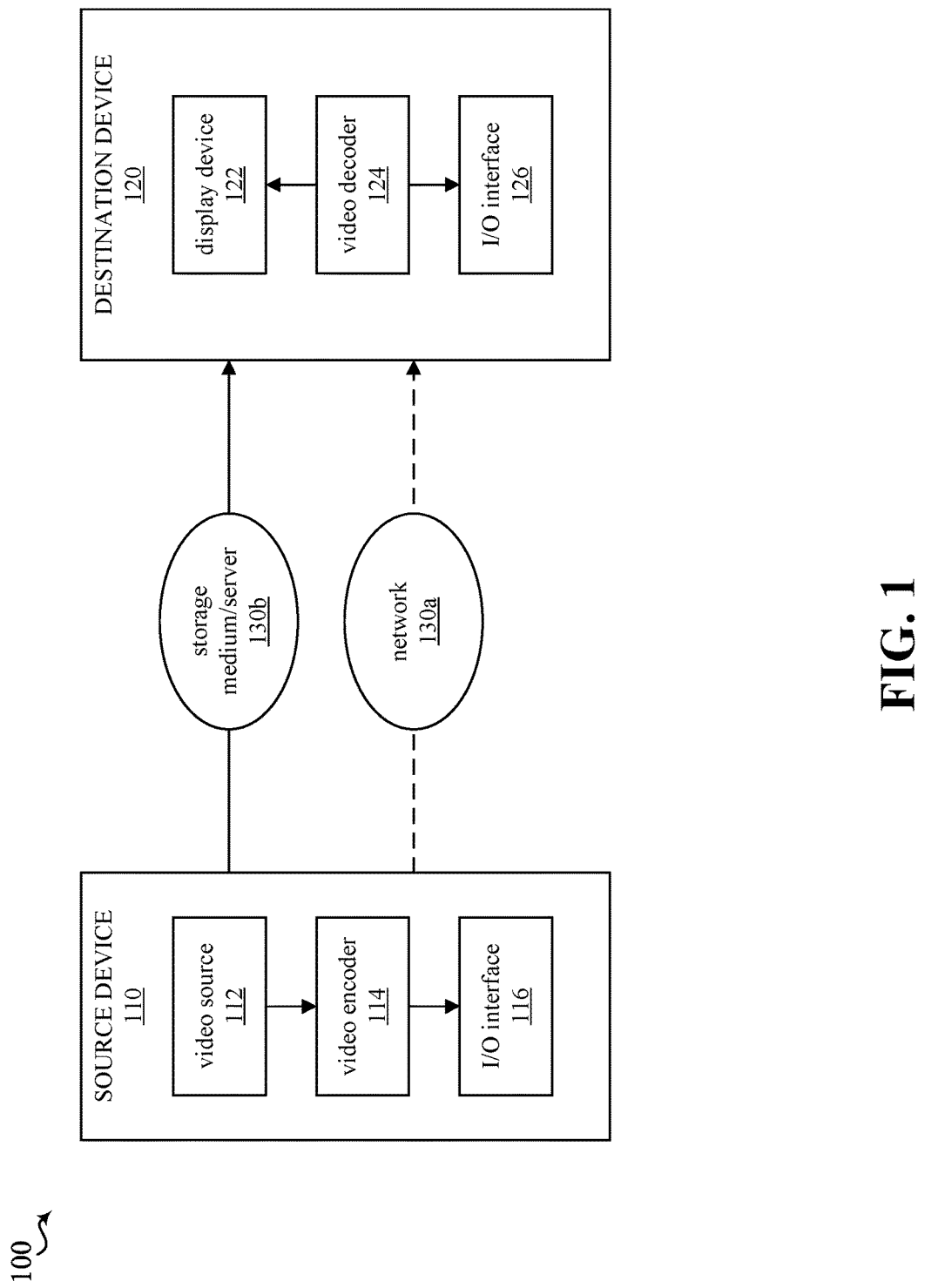
FIG. 1 is a block diagram that illustrates an example of a video coding system, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to a person having ordinary skill in the art that these concepts may be practiced without these specific details. In some instances, structures and components are shown in block diagram form in order to avoid obscuring such concepts.

Several aspects of video coding and decoding will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media, which may be referred to as non-transitory computer-readable media. Non-transitory computer-readable media may exclude transitory signals. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The present aspects generally relate to video processing in constrained resource contexts. In some aspects, resource constraints may negatively affect video processing performance. Some examples of video processing resources include memory, processing speed, and encoding/decoding rates. In addition, reducing resource requirements may reduce coding efficiency, while adding resources to a device may be costly and/or impractical.

The present disclosure relates to enhancements to video processing, and in particular, efficiently improving video performance in a constrained resource context. For instance, in some aspect, a computing system implementing a video processing operation (e.g., encoding or decoding) may detect a constrained resource context with respect to one or more resources of the computing device. Further, the computing device may determine a predefined bitstream to employ in response to the constrained resource context. In some aspects, employing the predefined bitstream may help alleviate the constraints on the one or more resources by temporarily reducing resource requirements of the video processing operation by performing a conversion step using the predefined bitstream.

FIG. 1 is a block diagram that illustrates an example of a video coding system 100 that may utilize the techniques of this disclosure. As shown in FIG. 1, video coding system 100 may include a source device 110 and a destination device 120. The source device 110, which may be referred to as a video encoding device, may generate encoded video data. The destination device 120, which may be referred to as a video decoding device, may decode the encoded video data generated by the source device 110. The source device 110 may include a video source 112, a video encoder 114, and an input/output (I/O) interface 116.

The video source 112 may include a source such as a video capture device, an interface to receive video data from a video content provider, and/or a computer graphics system for generating video data, or a combination of such sources. The video data may comprise one or more pictures or images. The terms "picture," "image," or "frame" can be used interchangeably throughout to refer to a single image in a stream of images that produce a video. The video encoder 114 encodes the video data from the video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. The I/O interface 116 may include a modulator/demodulator (modem) and/or a transmitter, a bus, or substantially any mechanism that facilitates transfer of data between devices or within a computing device that may include both the source device 110 and destination device 120 (e.g., where the computing device stores the encoded video generated using functions of the source device 110 for display using functions of the destination device 120). In one example, the encoded video data may be transmitted directly to destination device 120 via the I/O interface 116 through the network 130a. The encoded video data may also be stored onto a storage medium/server 130b for access by destination device 120.

The destination device 120 may include an I/O interface 126, a video decoder 124, and a display device 122. The I/O interface 126 may include a receiver and/or a modem, a bus, or substantially any mechanism that facilitates transfer of data between devices or within a computing device. The I/O interface 126 may acquire encoded video data from the source device 110 or the storage medium/server 130b. The video decoder 124 may decode the encoded video data. The display device 122 may display the decoded video data to a user. The display device 122 may be integrated with the destination device 120, or may be external to the destination device 120 which be configured to interface with an external display device.

The video encoder 114 and the video decoder 124 may operate according to a video compression standard, such as the AVC standard, HEVC standard, VVC standard and other current and/or further standards.

For example, in an AVC standard aspect, the video encoder 114 and/or the video decoder 124 may be configured to perform multi-picture inter-picture prediction. In some aspects, multi-picture inter-picture prediction within AVC may use previously encoded pictures as references in a much more flexible way than in past standards, allowing up to 16 reference frames (or 32 reference fields, in the case of interlaced encoding) to be used in some cases. In profiles that support non-IDR frames, most levels specify that sufficient buffering should be available to allow for at least 4 or 5 reference frames at maximum resolution. This is in contrast to prior standards, where the limit was typically one; or, in the case of conventional "B pictures" (B-frames), two.

Further, multi-picture inter-picture prediction within AVC may use variable block-size motion compensation (VB-SMC) with block sizes as large as 16×16 and as small as 4×4, enabling precise segmentation of moving regions. The supported luma prediction block sizes include 16×16, 16×8, 8×16, 8×8, 8×4, 4×8, and 4×4, many of which can be used together in a single macroblock. In some aspects, chroma prediction block sizes are correspondingly smaller when chroma subsampling is used.

Further, multi-picture inter-picture prediction within AVC may have the ability to use multiple motion vectors per macroblock (one or two per partition) with a maximum of 32 in the case of a B macroblock constructed of 16 4×4 partitions. The motion vectors for each 8×8 or larger partition region can point to different reference pictures. Additionally, AVC may have the ability to use any macroblock type in B-frames, including I-macroblocks, resulting in much more efficient encoding when using B-frames.

Further, multi-picture inter-picture prediction within AVC may use six-tap filtering for derivation of half-pel luma sample predictions, for sharper subpixel motion-compensation. In some aspects, quarter-pixel motion is derived by linear interpolation of the half pixel values, to save processing power.

Further, multi-picture inter-picture prediction within AVC may use quarter-pixel precision for motion compensation, enabling precise description of the displacements of moving areas. For chroma the resolution is typically halved both vertically and horizontally (see 4:2:0) therefore the motion compensation of chroma uses one-eighth chroma pixel grid units.

Further, multi-picture inter-picture prediction within AVC may use weighted prediction, which allows an encoder to specify the use of a scaling and offset when performing motion compensation, and providing a significant benefit in performance in special cases—such as fade-to-black, fade-in, and cross-fade transitions. This includes implicit weighted prediction for B-frames, and explicit weighted prediction for P-frames.

Further, AVC may use spatial prediction from the edges of neighboring blocks for "intra" coding, rather than the "DC"-only prediction found in MPEG-2 Part 2 and the transform coefficient prediction found in H.263v2 and MPEG-4 Part 2. This includes luma prediction block sizes of 16×16, 8×8, and 4×4 (of which only one type can be used within each macroblock).

Further, AVC may use integer discrete cosine transform (integer DCT), a type of discrete cosine transform (DCT) where the transform is an integer approximation of the standard DCT. It has selectable block sizes and exact-match integer computation to reduce complexity. In some aspects, integer DCT may use an exact-match integer 4×4 spatial block transform, allowing precise placement of residual signals with little of the "ringing" often found with prior codec designs. It is similar to the standard DCT used in previous standards, but uses a smaller block size and simple integer processing. Unlike the cosine-based formulas and tolerances expressed in earlier standards, integer processing provides an exactly specified decoded result. Further, in some aspects, integer DCT may use an exact-match integer 8×8 spatial block transform, allowing highly correlated regions to be compressed more efficiently than with the 4×4 transform. This design is based on the standard DCT, but simplified and made to provide exactly specified decoding. Further, in some aspects, integer DCT may use adaptive encoder selection between the 4×4 and 8×8 transform block sizes for the integer transform operation. Further, in some aspects, integer DCT may use a secondary Hadamard transform performed on "DC" coefficients of the primary spatial transform applied to chroma DC coefficients (and also luma in one special case) to obtain even more compression in smooth regions.

Further, AVC may use lossless macroblock coding features including a lossless "PCM macroblock" representation mode in which video data samples are represented directly, which allows perfect representation of specific regions and allowing a strict limit to be placed on the quantity of coded data for each macroblock. Further, AVC may use lossless macroblock coding features including an enhanced lossless macroblock representation mode allowing perfect representation of specific regions while using substantially fewer bits than the PCM mode.

Further, AVC may use flexible interlaced-scan video coding features including macroblock-adaptive frame-field (MBAFF) coding, which uses a macroblock pair structure for pictures coded as frames, allowing 16×16 macroblocks in field mode (compared with MPEG-2, where field mode processing in a picture that is coded as a frame results in the processing of 16×8 half-macroblocks). Further, AVC may use lossless macroblock coding features including picture-adaptive frame-field coding (PAFF or PicAFF) allowing a freely selected mixture of pictures coded either as complete frames where both fields are combined together for encoding or as individual single fields.

Further, AVC may use a quantization design including logarithmic step size control for easier bitrate management by encoders and simplified inverse-quantization scaling, and frequency-customized quantization scaling matrices selected by the encoder for perceptual-based quantization optimization. In addition, AVC may use an in-loop deblocking filter that helps prevent the blocking artifacts common to other DCT-based image compression techniques, resulting in better visual appearance and compression efficiency.

Additionally, AVC may use an entropy coding design including context-adaptive binary arithmetic coding (CABAC), which is an algorithm to losslessly compress syntax elements in the video stream knowing the probabilities of syntax elements in a given context. In some aspects, CABAC compresses data more efficiently than CAVLC but requires considerably more processing to decode. Further, in some aspects, the entropy coding design of AVC may include context-adaptive variable-length coding (CAVLC), which is a lower-complexity alternative to CABAC for the coding of quantized transform coefficient values. Although CAVLC is of a lower complexity than CABAC, CAVLC may be more elaborate and more efficient than the methods typically used to code coefficients in other prior designs. Further, in some aspects, the entropy coding design of AVC may include a common simple and highly structured variable length coding (VLC) technique for many of the syntax elements not coded by CABAC or CAVLC, referred to as Exponential-Golomb coding (or Exp-Golomb).

Further, AVC may use loss resilience features including a network abstraction layer (NAL) definition allowing the same video syntax to be used in many network environments. One concept of H.264 is to generate self-contained packets, to remove the header duplication as in MPEG-4's Header Extension Code (HEC). This was achieved by decoupling information relevant to more than one slice from the media stream. The combination of the higher-level parameters is called a parameter set. The H.264 specification includes two types of parameter sets: Sequence Parameter Set (SPS) and Picture Parameter Set (PPS). An active sequence parameter set remains unchanged throughout a coded video sequence, and an active picture parameter set remains unchanged within a coded picture. The sequence and picture parameter set structures contain information such as picture size, optional coding modes employed, and macroblock to slice group map. Similarly to H.264/AVC, HEVC and VVC use a NAL unit based bitstream structure.

In addition, AVC may use loss resilience features including flexible macroblock ordering (FMO), also known as slice groups, and arbitrary slice ordering (ASO), which are techniques for restructuring the ordering of the representation of the fundamental regions (macroblocks) in pictures. Typically considered an error/loss robustness feature, FMO and ASO can also be used for other purposes.

Further, AVC may use loss resilience features including data partitioning (DP), which is a feature that provides the ability to separate more important and less important syntax elements into different packets of data and may enable the application of unequal error protection (UEP) and other types of improvement of error/loss robustness. In addition, AVC may use entropy coding design loss resilience features including redundant slices (RS), which is an error/loss robustness feature that lets an encoder send an extra representation of a picture region (typically at lower fidelity) that can be used if the primary representation is corrupted or lost. Additionally, AVC may use loss resilience features including frame numbering, which is a feature that allows the creation of "sub-sequences", enabling temporal scalability by optional inclusion of extra pictures between other pictures, and the detection and concealment of losses of entire pictures, which can occur due to network packet losses or channel errors.

Further, AVC may use switching slices, called SP and SI slices, which allows an encoder to direct a decoder to jump into an ongoing video stream for such purposes as video streaming bitrate switching and "trick mode" operation. In some aspects, when a decoder jumps into the middle of a video stream using the SP/SI feature, the decoder can get an exact match to the decoded pictures at that location in the video stream despite using different pictures, or no pictures at all, as references prior to the switch. In addition, AVC may use a simple automatic process for preventing the accidental emulation of start codes, which are special sequences of bits in the coded data that allow random access into the bitstream and recovery of byte alignment in systems that can lose byte synchronization.

Further, AVC may use supplemental enhancement information (SEI) and video usability, which are extra information that can be inserted into the bitstream for various purposes such as indicating the color space used the video content or various constraints that apply to the encoding. SEI messages can contain arbitrary user-defined metadata payloads or other messages with syntax and semantics defined in the standard. Addition, in some aspects, AVC may use auxiliary pictures, which can be used for such purposes as alpha compositing.

Further, AVC may offer support of monochrome (4:0:0), 4:2:0, 4:2:2, and 4:4:4 chroma sampling (depending on the selected profile), and support of sample bit depth precision ranging from 8 to 14 bits per sample (depending on the selected profile). Additionally, in some aspects, AVC may offer the ability encode individual color planes as distinct pictures with their own slice structures, macroblock modes, motion vectors, etc., allowing encoders to be designed with a simple parallelization structure. In addition, AVC may use picture order count, which is a feature that serves to keep the ordering of the pictures and the values of samples in the decoded pictures isolated from timing information, and allows timing information to be carried and controlled/changed separately by a system without affecting decoded picture content.

In addition, HEVC and VVC are successors to AVC, and may offer advantages to AVC. For example, as described herein, HEVC uses integer DCT and DST transforms with varied block sizes between 4×4 and 32×32. As another example, HEVC benefits from the use of larger coding tree unit (CTU) sizes in comparison to AVC, which increases coding efficiency while also reducing decoding time.

Figure 2:
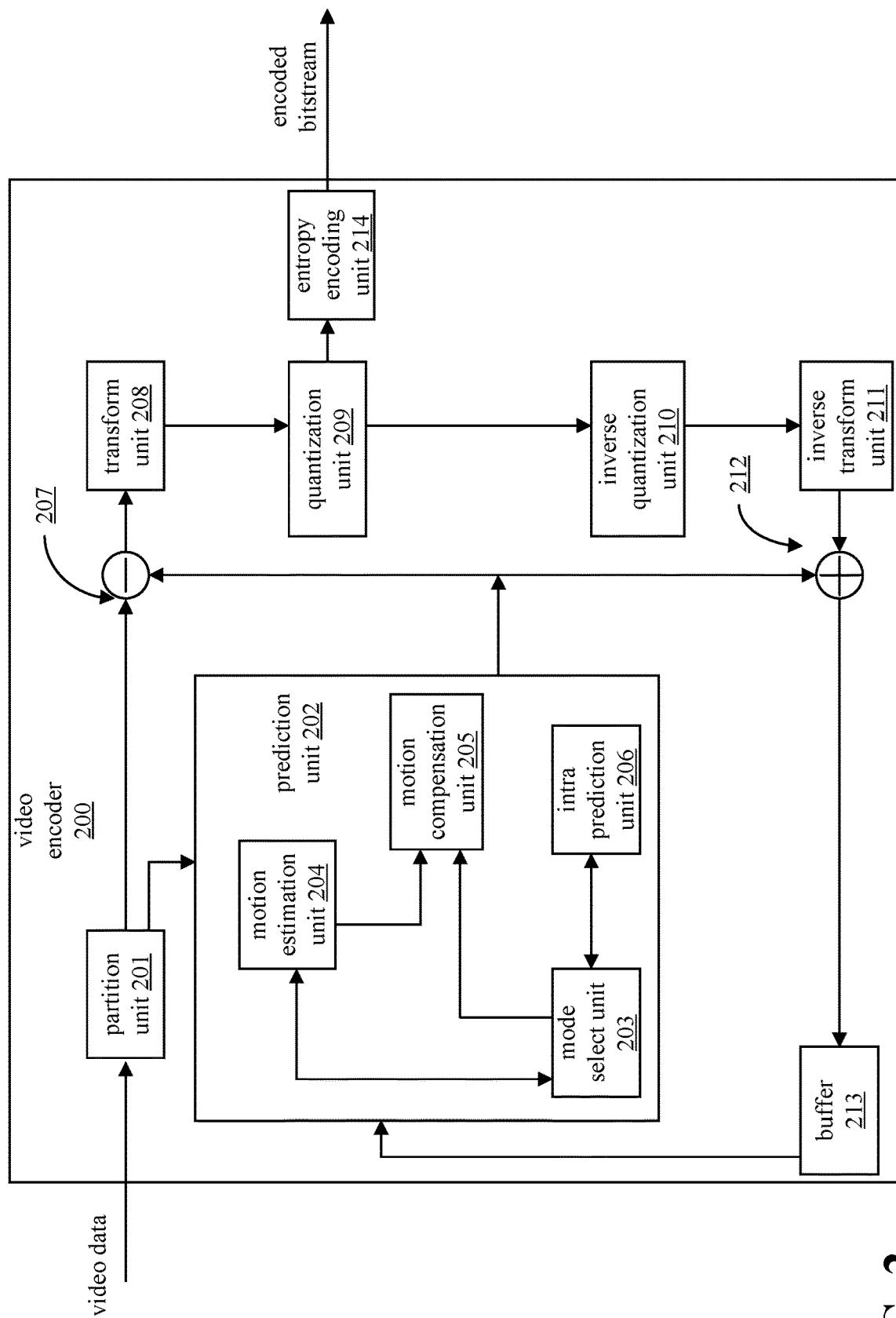
FIG. 2 is a block diagram that illustrates a first example of a video encoder, in accordance with some aspects of the present disclosure.

FIG. 2 is a block diagram illustrating an example of a video encoder 200, which may be an example of the video encoder 114 in the system 100 illustrated in FIG. 1, in accordance with some aspects of the present disclosure.

The video encoder 200 may be configured to perform any or all of the techniques of this disclosure. In the example of FIG. 2, the video encoder 200 includes a plurality of functional components. The techniques described in this disclosure may be shared among the various components of the video encoder 200. In some examples, a processor may be configured to perform any or all of the techniques described in this disclosure, including those of video encoder 200.

The functional components of video encoder 200 may include one or more of a partition unit 201, a prediction unit 202 which may include a mode select unit 203, a motion estimation unit 204, a motion compensation unit 205 and an intra-prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, the video encoder 200 may include more, fewer, or different functional components. In an example, the prediction unit 202 may include an intra block copy (IBC) unit. The IBC unit may perform prediction in an IBC mode in which at least one reference picture is a picture where the current video block is located.

Furthermore, some components, such as the motion estimation unit 204 and the motion compensation unit 205, may be highly integrated, but are separately represented in the example of FIG. 2 for purposes of explanation.

The partition unit 201 may partition a picture into one or more video blocks. The video encoder 200 and the video decoder 300 may support various video block sizes.

The mode select unit 203 may select one of the coding modes, intra or inter, e.g., based on error results, and provide the resulting intra- or inter-coded block to at least one of a residual generation unit 207 to generate residual block data and to a reconstruction unit 212 to reconstruct the encoded block for use as a reference picture. In some examples, the mode select unit 203 may select a combination of intra- and inter-prediction (CIIP) mode in which the prediction is based on an inter-prediction signal and an intra-prediction signal. The mode select unit 203 may also select a resolution for a motion vector (e.g., a sub-pixel or integer pixel precision) for the block in the case of inter-prediction.

To perform inter-prediction on a current video block, the motion estimation unit 204 may generate motion information for the current video block by comparing one or more reference frames from buffer 213 to the current video block. In an example, each reference frame can correspond to a picture of the video. The motion compensation unit 205 may determine a predicted video block for the current video block based on the motion information and decoded samples of pictures from the buffer 213 other than the picture associated with the current video block.

The motion estimation unit 204 and the motion compensation unit 205 may perform different operations for a current video block, for example, depending on whether the current video block is in an I-slice, a P-slice, or a B-slice. As used herein, in some aspects, an "I-slice" may refer to a portion of a picture composed of macroblocks, all of which are based upon macroblocks within the same picture. Further, as used herein, in some aspects, "P-slices" and "B-slices" may refer to portions of a picture composed of macroblocks that are not dependent on macroblocks in the same picture.

In some examples, the motion estimation unit 204 may perform uni-directional prediction for the current video block, and the motion estimation unit 204 may search reference pictures of list 0 or list 1 for a reference video block for the current video block. The motion estimation unit 204 may then generate a reference index that indicates the reference picture in list 0 or list 1 that contains the reference video block and a motion vector that indicates a spatial displacement between the current video block and the reference video block. The motion estimation unit 204 may output the reference index, a prediction direction indicator, and the motion vector as the motion information of the current video block. The motion compensation unit 205 may generate the predicted video block of the current block based on the reference video block indicated by the motion information of the current video block.

In other examples, the motion estimation unit 204 may perform bi-directional prediction for the current video block, where the motion estimation unit 204 may search the reference pictures in list 0 for a reference video block for the current video block and may also search the reference pictures in list 1 for another reference video block for the current video block. The motion estimation unit 204 may then generate reference indexes that indicate the reference pictures in list 0 and list 1 containing the reference video blocks and motion vectors that indicate spatial displacements between the reference video blocks and the current video block. The motion estimation unit 204 may output the reference indexes and the motion vectors of the current video block as the motion information of the current video block. The motion compensation unit 205 may generate the predicted video block of the current video block based on the reference video blocks indicated by the motion information of the current video block.

In some examples, the motion estimation unit 204 may output a full set of motion information for decoding processing of a decoder.

In some examples, the motion estimation unit 204 may not output a full set of motion information for the current video. Rather, the motion estimation unit 204 may signal the motion information of the current video block with reference to the motion information of another video block. For example, the motion estimation unit 204 may determine that the motion information of the current video block is sufficiently similar to the motion information of a neighboring video block.

In one example, the motion estimation unit 204 may indicate, in a syntax structure associated with the current video block, a value that indicates to the video decoder 300 that the current video block has the same motion information as the another video block.

In another example, the motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

The intra-prediction unit 206 may perform intra-prediction on the current video block. When the intra-prediction unit 206 performs intra-prediction on the current video block, the intra-prediction unit 206 may generate prediction data for the current video block based on decoded samples of other video blocks in the same picture. The prediction data for the current video block may include at least one of a predicted video block or one or more syntax elements.

The residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and the residual generation unit 207 may not perform the subtracting operation.

The transform unit 208, which may also be referred to as a transform processing unit, may generate one or more transform coefficient video blocks for the current video block by applying one or more transforms to a residual video block associated with the current video block.

After the transform unit 208 generates a transform coefficient video block associated with the current video block, the quantization unit 209 may quantize the transform coefficient video block associated with the current video block based on one or more quantization parameter (QP) values associated with the current video block.

The inverse quantization unit 210 and the inverse transform unit 211 may apply inverse quantization and inverse transforms to the transform coefficient video block, respectively, to reconstruct a residual video block from the transform coefficient video block. The reconstruction unit 212 may add the reconstructed residual video block to corresponding samples from one or more predicted video blocks generated by the prediction unit 202 to produce a reconstructed video block associated with the current block for storage in the buffer 213.

After the reconstruction unit 212 reconstructs the video block, loop filtering operation may be performed to reduce video blocking artifacts in the video block.

The entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 3:
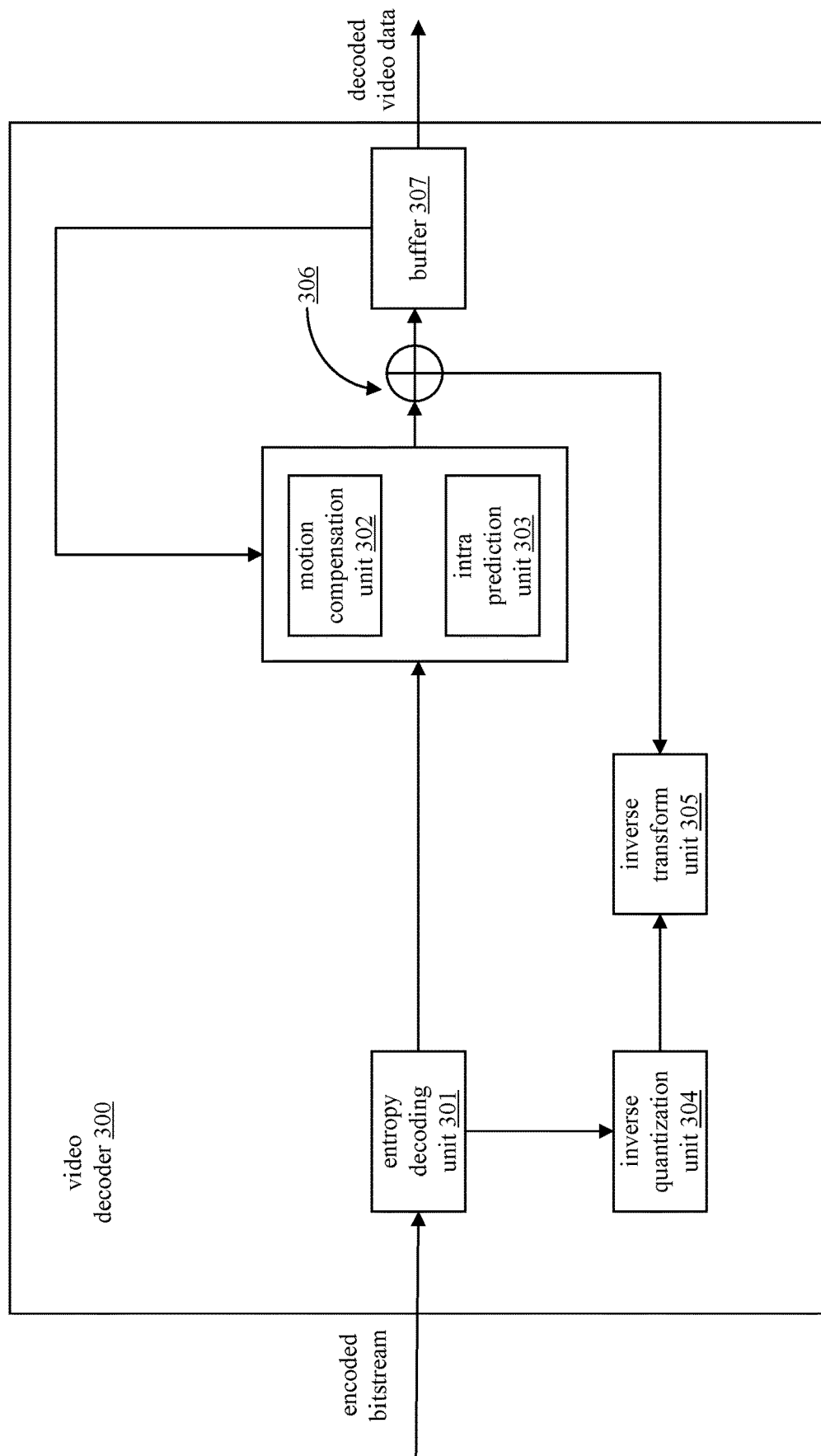
FIG. 3 is a block diagram that illustrates an example of a video decoder, in accordance with some aspects of the present disclosure.

FIG. 3 is a block diagram illustrating an example of video decoder 300, which may be an example of the video decoder 124 in the system 100 illustrated in FIG. 1, in accordance with some aspects of the present disclosure.

The video decoder 300 may be configured to perform any or all of the techniques of this disclosure. In the example of FIG. 3, the video decoder 300 includes a plurality of functional components. The techniques described in this disclosure may be shared among the various components of the video decoder 300. In some examples, a processor may be configured to perform any or all of the techniques described in this disclosure, including those of video decoder 300.

In the example of FIG. 3, the video decoder 300 includes one or more of an entropy decoding unit 301, a motion compensation unit 302, an intra-prediction unit 303, an inverse quantization unit 304, an inverse transform unit 305, a reconstruction unit 306, and a buffer 307. The video decoder 300 may, in some examples, perform a decoding pass generally reciprocal to the encoding pass described with respect to video encoder 200 (FIG. 2).

The video decoder 300 may receive, via the entropy decoding unit 301 or otherwise, an encoded bitstream. The encoded bitstream may include entropy coded video data (e.g., encoded blocks of video data). In this example, the entropy decoding unit 301 may decode the entropy coded video data. Based on the decoded video data, whether entropy decoded or otherwise, the motion compensation unit 302 may determine motion information including motion vectors, motion vector precision, reference picture list indexes, and other motion information. The motion compensation unit 302 may, for example, determine such information by performing the AMVP and merge mode. AMVP may be used, including derivation of several most probable candidates based on data from adjacent PBs and the reference picture. Motion information typically includes the horizontal and vertical motion vector displacement values, one or two reference picture indices, and, in the case of prediction regions in B slices, an identification of which reference picture list is associated with each index. As used herein, in some aspects, a "merge mode" may refer to deriving the motion information from spatially or temporally neighboring blocks.

The motion compensation unit 302 may produce motion compensated blocks, possibly performing interpolation based on interpolation filters. Identifiers for interpolation filters to be used with sub-pixel precision may be included in syntax elements received with the encoded bitstream or in separate assistance information, e.g., as specified by a video encoder when encoding the video.

The motion compensation unit 302 may use interpolation filters as used by video encoder 200 during encoding of the video block to calculate interpolated values for sub-integer pixels of a reference block. The motion compensation unit 302 may determine the interpolation filters used by video encoder 200 according to received syntax information and use the interpolation filters to produce predictive blocks.

The motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence. As used herein, in some aspects, a "slice" may refer to a data structure that can be decoded independently from other slices of the same picture, in terms of entropy coding, signal prediction, and residual signal reconstruction. A slice can either be an entire picture or a region of a picture.

The intra-prediction unit 303 may use intra-prediction modes for example received in the bitstream to form a prediction block from spatially adjacent blocks. Intra-prediction can be referred to herein as "intra," and/or intra-prediction modes can be referred to herein as "intra modes" The inverse quantization unit 304 inverse quantizes, i.e., de-quantizes, the quantized video block coefficients provided in the bitstream and decoded by entropy decoding unit 301. Inverse transform unit 305 applies an inverse transform.

The reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra-prediction and also produces decoded video for presentation on a display device.

Although the following description may be focused on Advanced Video Coding (AVC), High Efficiency Video Coding (HEVC), and/or the standard Versatile Video Coding (VVC), the concepts described herein may be applicable to other coding standards or video codec.

Figure 4:
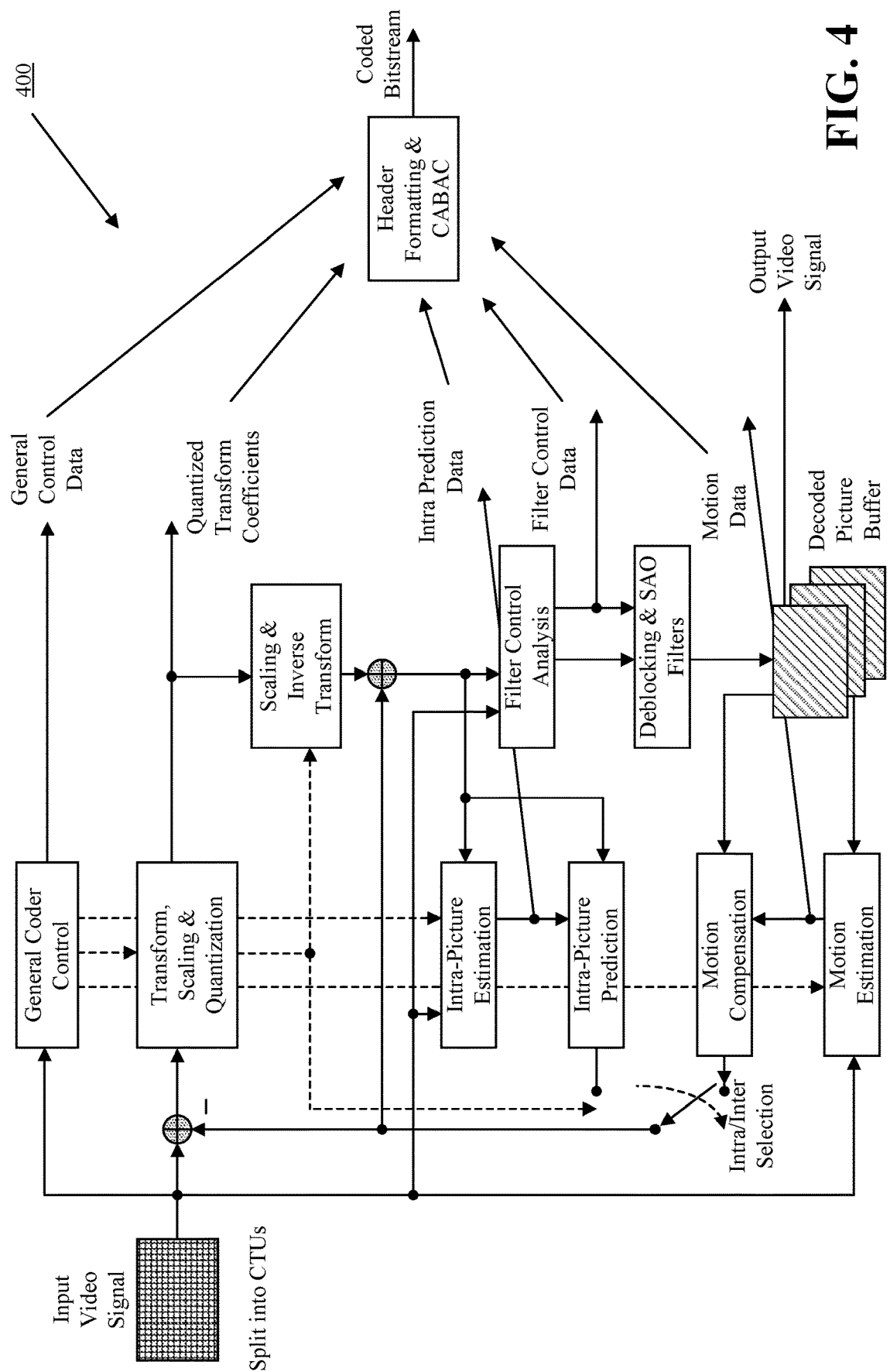
FIG. 4 is a block diagram that illustrates a second example of a video encoder, in accordance with some aspects of the present disclosure.

FIG. 4 shows an example of a block diagram of a HEVC video encoder and decoder 400, which may be the video encoder 114 and video decoder 124 in the video coding system 100 illustrated in FIG. 1, video encoder 200 in FIG. 2 and video decoder 300 in FIG. 3, etc., in accordance with some aspects of the present disclosure. The HEVC video coding layer uses the same "hybrid" approach in that it uses inter-/intra-picture prediction and 2D transform coding. In some aspects, a HEVC encoder first proceeds by splitting a picture into block shaped regions for the first picture, or the first picture of a random access point, which uses intra-picture prediction. As used herein, intra-picture prediction may refer to when the prediction of the blocks in the picture is based only on the information in that picture. For all other pictures, inter-picture prediction is used, in which prediction information is used from other pictures. After the prediction methods are finished and the picture goes through the loop filters, the final picture representation is stored in the decoded picture buffer. Pictures stored in the decoded picture buffer can be used for the prediction of other pictures.

HEVC was designed with the idea that progressive scan video would be used and no coding tools were added specifically for interlaced video. Interlace specific coding tools, such as MBAFF and PAFF, are not supported in HEVC. HEVC instead sends metadata that tells how the interlaced video was sent. Interlaced video may be sent either by coding each frame as a separate picture or by coding each field as a separate picture. For interlaced video HEVC can change between frame coding and field coding using Sequence Adaptive Frame Field (SAFF), which allows the coding mode to be changed for each video sequence. This allows interlaced video to be sent with HEVC without needing special interlaced decoding processes to be added to HEVC decoders.

The encoding algorithm for generating HEVC-compliant bitstreams may proceed as follows. Each picture can be divided into block regions (e.g., coding tree units (CTUs)), and the precise block division may be transmitted to the decoder. HEVC replaces 16×16 pixel macroblocks, which were used with previous standards, with coding tree units (CTUs) which can use larger block structures of up to 64×64 samples and can better sub-partition the picture into variable sized structures. HEVC initially divides the picture into CTUs which can be 64×64, 32×32, or 16×16 with a larger pixel block size usually increasing the coding efficiency.

A CTU consists of a luma coding tree block (CTB) and the corresponding chroma CTBs and syntax elements. The size L×L of a luma CTB can be chosen as L=16, 32, or 64 samples, where the larger sizes can enable higher compression. HEVC then supports a partitioning of the CTBs into smaller blocks using a tree structure and quadtree-like signaling. The quadtree syntax of the CTU specifies the size and positions of its luma and chroma CBs. The root of the quadtree is associated with the CTU. Hence, the size of the luma CTB is the largest supported size for a luma CB. The splitting of a CTU into luma and chroma CBs may be jointly signalled. One luma CB and ordinarily two chroma CBs, together with associated syntax, form a coding unit (CU). A CTB may contain only one CU or may be split to form multiple CUs, and each CU has an associated partitioning into prediction units (PUs) and a tree of transform units (TUs).

The first picture of the video sequence (and/or the first picture at each clean random access point that enters the video sequence) can use only intra-picture prediction, which uses region-to-region spatial data prediction within the same picture, but does not rely on other pictures to encode the first picture. For the remaining pictures between sequential or random access points, the inter-picture temporal prediction coding mode may be used for most blocks. The encoding process for inter-picture prediction includes selecting motion data including a selected reference picture and a motion vector (MV) to be applied to predict samples of each block.

The decision whether to code a picture area using inter-picture or intra-picture prediction can be made at the CU level. A PU partitioning structure has its root at the CU level. Depending on the basic prediction-type decision, the luma and chroma CBs can then be further split in size and predicted from luma and chroma prediction blocks (PBs). HEVC supports variable PB sizes from 64×64 down to 4×4 samples. The prediction residual is coded using block transforms. A TU tree structure has its root at the CU level. The luma CB residual may be identical to the luma transform block (TB) or may be further split into smaller luma TBs. The same applies to the chroma TBs.

HEVC specifies four transform units (TUs) sizes of 4×4, 8×8, 16×16, and 32×32 to code the prediction residual. A CTB may be recursively partitioned into 4 or more TUs. TUs use integer basis functions based on the discrete cosine transform (DCT). In addition, 4×4 luma transform blocks that belong to an intra coded region are transformed using an integer transform that is derived from discrete sine transform (DST). This provides a 1% bitrate reduction but was restricted to 4×4 luma transform blocks due to marginal benefits for the other transform cases. Chroma uses the same TU sizes as luma so there is no 2×2 transform for chroma.

The encoder and decoder may apply motion compensation (MC) by using MV and mode decision data to generate the same inter-picture prediction signal, which is transmitted as auxiliary information. The residual signal of intra-picture or inter-picture prediction can be transformed by linear spatial transformation, which is the difference between the original block and its prediction. Then the transform coefficients can be scaled, quantized, entropy encoded, and transmitted together with the prediction information.

The encoder can duplicate the decoder processing loop so that both can generate the same prediction for subsequent data. Therefore, the quantized transform coefficients can be constructed by inverse scaling, and then can be inversely transformed to replicate the decoding approximation of the residual signal. The residual can then be added to the prediction, and the result of this addition can then be fed into one or two loop filters to smooth the artifacts caused by block-by-block processing and quantization. The final picture representation (i.e., the copy output by the decoder) can be stored in the decoded picture buffer for prediction of subsequent pictures. In general, the order of encoding or decoding processing of pictures may be different from the order in which they arrive from the source. As such, in some examples, it may be necessary to distinguish between the decoding order of the decoder (that is, the bit stream order) and the output order (that is, the display order).

In some aspects, HEVC may include one or more tools for parallel processing. The use of tiles in HEVC may allow for the picture to be divided into a grid of rectangular regions that can independently be decoded and/or encoded. The tiles can be independently decoded and can even allow for random access to specific regions of a picture in a video stream. Wavefront parallel processing (WPP) may include dividing a slice into rows of CTUs in which the first row is decoded normally but each additional row requires that decisions be made in the previous row. WPP has the entropy encoder use information from the preceding row of CTUs and allows for a method of parallel processing that may allow for better compression than tiles. In some aspects, if tiles are present, they must be at least 64 pixels high and 256 pixels wide with a level specific limit on the number of tiles allowed.

Slices can, for the most part, be decoded independently from each other with the main purpose of tiles being the re-synchronization in case of data loss in the video stream. Further, slices can be defined as self-contained in that prediction is not made across slice boundaries. When in-loop filtering is done on a picture though, information across slice boundaries may be required. Slices are CTUs decoded in the order of the raster scan, and different coding types can be used for slices such as I types, P types, or B types. Dependent slices can allow for data related to tiles or WPP to be accessed more quickly by the system than if the entire slice had to be decoded. The main purpose of dependent slices is to allow for low-delay video encoding due to its lower latency.

In some aspects, HEVC uses a context-adaptive binary arithmetic coding (CABAC) algorithm. In some instances, CABAC may be the only entropy encoder method that is allowed in HEVC while there are two entropy encoder methods allowed by H.264/MPEG-4 AVC. CABAC and the entropy coding of transform coefficients in HEVC were designed for a higher throughput than H.264/MPEG-4 AVC, while maintaining higher compression efficiency for larger transform block sizes relative to simple extensions. For instance, the number of context coded bins has been reduced by 8× and the CABAC bypass-mode has been improved in terms of its design to increase throughput. Another improvement with HEVC is that the dependencies between the coded data have been changed to further increase throughput. Context modeling in HEVC has also been improved so that CABAC can better select a context that increases efficiency when compared with H.264/MPEG-4 AVC.

HEVC specifies 33 directional modes for intra prediction compared with the 8 directional modes for intra prediction specified by H.264/MPEG-4 AVC. HEVC also specifies DC intra prediction and planar prediction modes. The DC intra prediction mode may generate a mean value by averaging reference samples and can be used for flat surfaces. The planar prediction mode in HEVC may support all block sizes defined in HEVC while the planar prediction mode in H.264/MPEG-4 AVC is limited to a block size of 16×16 pixels. The intra prediction modes may use data from neighboring prediction blocks that have been previously decoded from within the same picture.

For the interpolation of fractional luma sample positions HEVC may use separable application of one-dimensional half-sample interpolation with an 8-tap filter or quarter-sample interpolation with a 7-tap filter while, in comparison, H.264/MPEG-4 AVC uses a two-stage process that first derives values at half-sample positions using separable one-dimensional 6-tap interpolation followed by integer rounding and then applies linear interpolation between values at nearby half-sample positions to generate values at quarter-sample positions. HEVC has improved precision due to the longer interpolation filter and the elimination of the intermediate rounding error. For 4:2:0 video, the chroma samples are interpolated with separable one-dimensional 4-tap filtering to generate eighth-sample precision, while in comparison H.264/MPEG-4 AVC uses only a 2-tap bilinear filter (also with eighth-sample precision).

As in H.264/MPEG-4 AVC, weighted prediction in HEVC can be used either with uni-prediction (in which a single prediction value is used) or bi-prediction (in which the prediction values from two prediction blocks are combined).

HEVC specifies two loop filters that are applied sequentially, with the DBF applied first and the sample adaptive offset SAO filter applied afterwards. Both loop filters are applied in the inter-picture prediction loop, i.e., the filtered image is stored in the decoded picture buffer (DPB) as a reference for inter-picture prediction.

In some aspects, the DBF in HEVC may similar to the one used by H.264/MPEG-4 AVC but with a simpler design and better support for parallel processing. In HEVC, DBF may only apply to a 8×8 sample grid while with H.264/MPEG-4 AVC, DBF applies to a 4×4 sample grid. In some aspects, DBF uses a 8×8 sample grid since it causes no noticeable degradation and significantly improves parallel processing because the DBF no longer causes cascading interactions with other operations. Another change is that HEVC only allows for three DBF strengths of 0 to 2. HEVC also requires that the DBF first apply horizontal filtering for vertical edges to the picture and only after that does it apply vertical filtering for horizontal edges to the picture. This allows for multiple parallel threads to be used for the DBF.

The SAO filter may be applied after the DBF and is designed to allow for better reconstruction of the original signal amplitudes by applying offsets stored in a lookup table in the bitstream. Per CTB the SAO filter can be disabled or applied in one of two modes: edge offset mode or band offset mode. In some aspects, the edge offset mode operates by comparing the value of a sample to two of its eight neighbors using one of four directional gradient patterns. Based on a comparison with these two neighbors, the sample is classified into one of five categories: minimum, maximum, an edge with the sample having the lower value, an edge with the sample having the higher value, or monotonic. For each of the first four categories an offset is applied. The band offset mode applies an offset based on the amplitude of a single sample. A sample is categorized by its amplitude into one of 32 bands (histogram bins). Offsets are specified for four consecutive of the 32 bands, because in flat areas which are prone to banding artifacts, sample amplitudes tend to be clustered in a small range. The SAO filter was designed to increase picture quality, reduce banding artifacts, and reduce ringing artifacts.

Range extensions in MPEG are additional profiles, levels, and techniques that support needs beyond consumer video playback. In some aspects, HEVC may include profiles supporting bit depths beyond 10, and differing luma/chroma bit depths, intra profiles for when file size is much less important than random-access decoding speed, and still picture profiles, forming the basis of high efficiency image file format (HEIF), without any limit on the picture size or complexity (level 8.5). In some aspects, unlike all other levels, no minimum decoder capacity is required, only a best-effort with reasonable fallback.

In some aspects, the aforementioned profiles provide enhanced coding features that may support efficient screen encoding or high-speed processing (e.g., persistent rice adaptation which includes a general optimization of entropy coding, higher precision weighted prediction at high bit depths, cross-component prediction which allows imperfect YCbCr color decorrelation to let the luma match set the predicted chroma matches and results in up to 7% gain for YCbCr 4:4:4 and up to 26% for RGB video, and intra smoothing control which allows the encoder to turn smoothing on or off per-block instead of per-frame. Further, the profiles may provide modifications of transform skip (e.g., residual DPCM (RDPCM) which may allow more-optimal coding of residual data in comparison to the typical zig-zag, block size flexibility which may support block sizes up to 32×32 in comparison to the 4×4 transform skip support in version 1, 4×4 rotation which may provide potential efficiency, transform skip context which enables DCT and RDPCM blocks to carry a separate context). In addition the profiles may provide extended precision processing which provides low bit-depth video for more accurate decoding, and CABAC bypass alignment which provides a decoding optimization specific to high throughput 4:4:4 16 intra profile.

Some versions of HEVC (e.g., version 2) may provide several supplemental enhancement information (SEI) messages including the following information: color remapping that maps from one color space to another, knee function that provides hints for converting between dynamic ranges (e.g., HDR to SDR), mastering display color volume, and time code information for archival purposes. Further, some versions of HEVC may include screen content coding extensions for adaptive color transform, adaptive motion vector resolution, intra block copying, and palette mode. Additionally, some versions of HEVC may include support Hybrid Log-Gamma (HLG) transfer function and the ICtCp color matrix, which provide support for HDR transfer functions.

In addition, some versions of HEVC (e.g., version 4) may provide several SEI messages including the following information: an alternative transfer characteristics information SEI message that provides information on the preferred transfer function to use, and an ambient viewing environment SEI message, provides information on the ambient light of the viewing environment that was used to author the video. In some aspects, the primary use case for the alternative transfer characteristics information may be to deliver HLG video in a way that would be backward compatible with legacy devices.

Video material encoded by HEVC can be input as a progressive image (e.g., because the source video originates from this format or is generated by de-interlacing before encoding). There is no explicit coding feature in the HEVC design to support the use of interlaced scanning, because interlaced scanning is no longer used for displays and becomes very uncommon for distribution. However, metadata syntax has been provided in HEVC to allow the encoder to indicate that it has been sent by encoding each area of the interlaced video (i.e., even or odd lines of each video frame) into a separate picture interlaced video, or by encoding each interlaced frame as a HEVC encoded picture to indicate that it has been sent. This can provide an effective method for encoding interlaced video without the need to support special decoding processes for it.

The HEVC standard supports color spaces such as generic film, NTSC, PAL, Rec. 601, Rec. 709, Rec. 2020, Rec. 2100, SMPTE 170M, SMPTE 240M, sRGB, sYCC, xvYCC, XYZ, and externally specified color spaces. HEVC supports color encoding representations such as RGB, YCbCr, and YCoCg.

Figure 5:
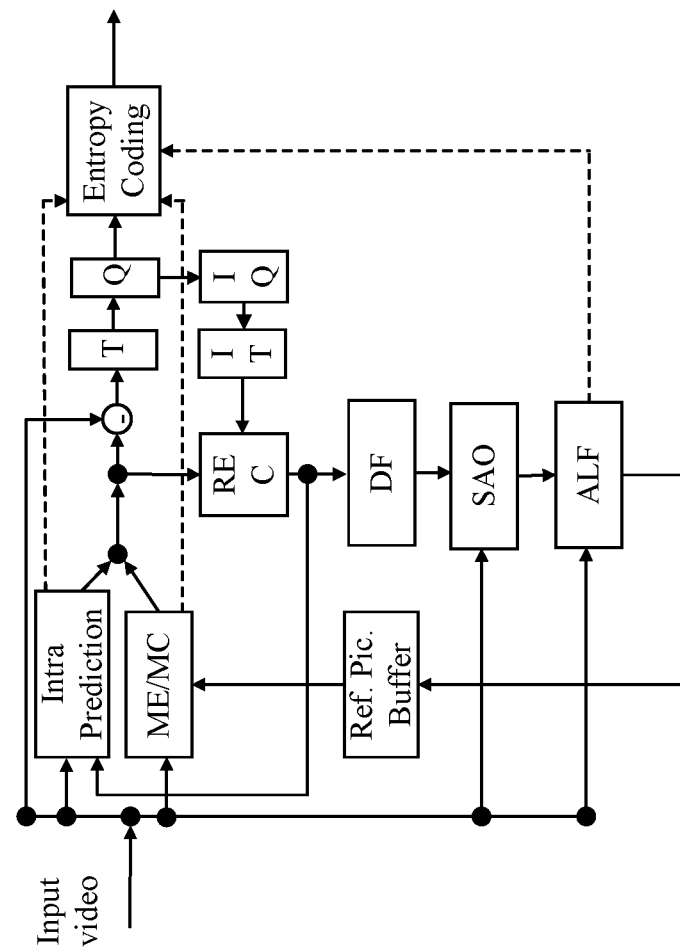
FIG. 5 is an example of an encoder block diagram of versatile video coding (VVC) in accordance with some aspects of the present disclosure.

FIG. 5 is an example of an encoder block diagram 500 of VVC, which can include multiple in-loop filtering blocks: e.g., deblocking filter (DBF), sample adaptive offset (SAO) adaptive loop filter (ALF), etc.

Unlike DBF, which uses predefined filters, SAO and ALF may utilize the original samples of the current picture to reduce the mean square errors between the original samples and the reconstructed samples by adding an offset and by applying a finite impulse response (FIR) filter, respectively, with coded side information signaling the offsets and filter coefficients. ALF may be located at the last processing stage of each picture and can be regarded as a tool to catch and fix artifacts created by the previous stages.

Figure 6:
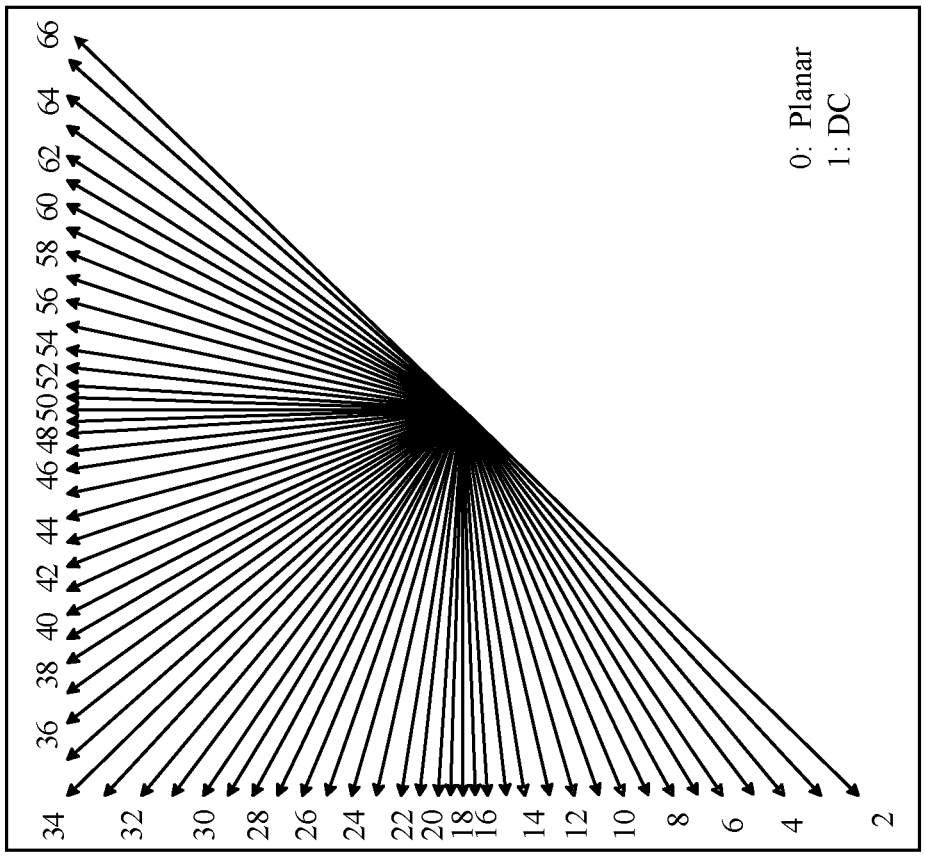
FIG. 6 is a schematic diagram of intra mode coding with 67 intra-prediction modes to capture the arbitrary edge directions presented in natural video in accordance with some aspects of the present disclosure.

FIG. 6 is a schematic diagram 600 of intra-prediction mode coding with 67 intra-prediction modes to capture the arbitrary edge directions presented in natural video. In some examples, the number of directional intra modes may be extended from 33, as used in HEVC, to 65 while the planar and the DC modes remain the same.

In some examples, the denser directional intra-prediction modes may apply for the block sizes and for both luma and chroma intra-predictions. In the HEVC, every intra-prediction mode coded block may include a square shape (e.g., a coded block of size N×N and the length of each of its side may be a power of 2 (e.g., where N is a power of 2). Thus, no division operations are required to generate an intra-predictor using DC mode. In VVC, blocks can have a rectangular shape that may necessitate the use of a division operation per block in the general case. To avoid division operations for DC prediction, the longer side may be used to compute the average for non-square blocks.

Although 67 modes are defined in the VVC, the exact prediction direction for a given intra-prediction mode index may be further dependent on the block shape. Conventional angular intra-prediction directions are defined from 45 degrees to −135 degrees in clockwise direction. In VVC, several conventional angular intra-prediction modes may be adaptively replaced with wide-angle intra-prediction modes for non-square blocks. The replaced modes may be signalled using the original mode indexes, which are remapped to the indexes of wide angular modes after parsing. In some examples, the total number of intra-prediction modes may be unchanged, i.e., 67, and the intra mode coding method may also be unchanged.

Figure 7:
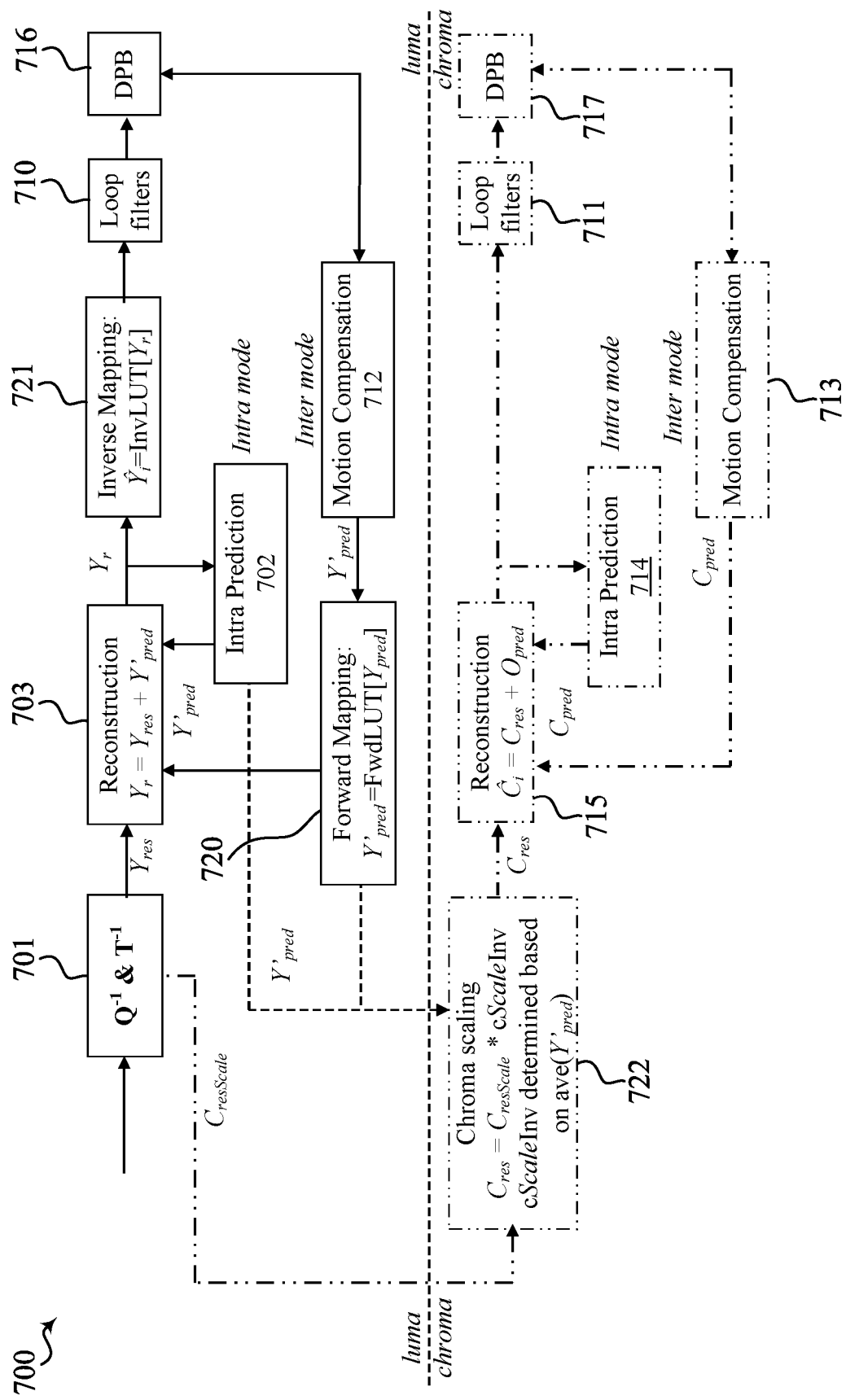
FIG. 7 is a diagram that illustrates an example architecture for luma mapping with chroma scaling, in accordance with various aspects of the disclosure.

FIG. 7 shows an example of LMCS architecture 700 for luma mapping with chroma scaling, in accordance with various aspects of the disclosure. As illustrated in FIG. 7, in VTM4, a coding tool called luma mapping with chroma scaling (LMCS) may be incorporated as a processing block before the loop filters. LMCS has two main components: 1) in-loop mapping of the luma component based on adaptive piecewise linear models; 2) for the chroma components, luma-dependent chroma residual scaling is applied. As described herein, a coding process may enable or disable LMCS for improved performance.

In particular, FIG. 7 illustrates an example of LMCS architecture 700 from a decoder perspective. Further, the blocks 701-703 in FIG. 7 indicate where the processing is applied in the mapped domain; and these include the inverse quantization and inverse transform 701, luma intra prediction 702, and adding of the luma prediction together with the luma residual 703. In addition, the blocks 710-717 in FIG. 7 indicate where the processing is applied in the original (i.e., non-mapped) domain; and these include loop filters 710-711 such as deblocking, ALF, and SAO, motion compensated prediction 712-713, chroma intra prediction 714, adding of the chroma prediction together with the chroma residual 715, and storage of decoded pictures as reference pictures 716-717. The blocks 720-722 in FIG. 7 are the new LMCS functional blocks, including forward and inverse mapping 720-721 of the luma signal and a luma-dependent chroma scaling process 722. Like most other tools in VVC, LMCS can be enabled/disabled at the sequence level using an SPS flag.

Figure 8A:
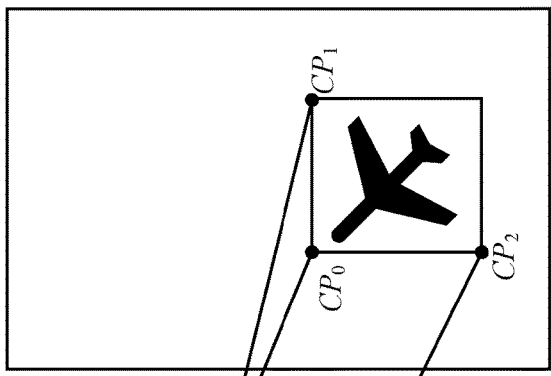
FIG. 8A is a diagram that illustrates an example of a 4-parameter affine model, in accordance with various aspects of the disclosure.
Figure 8A:
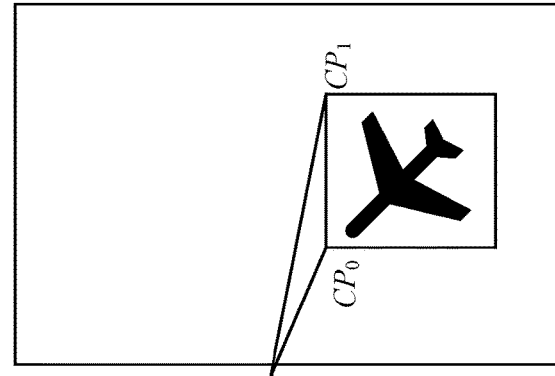
Figure 8B:
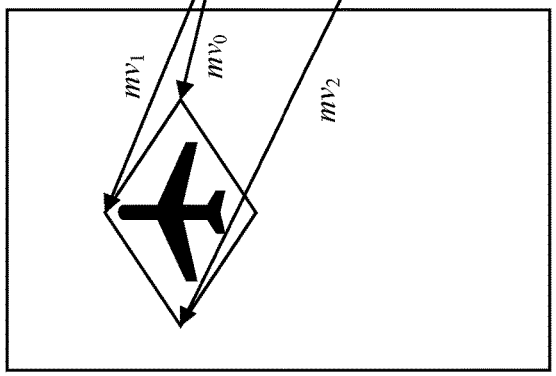
FIG. 8B is a diagram that illustrates an example of a 6-parameter affine model, in accordance with various aspects of the disclosure.
Figure 8B:
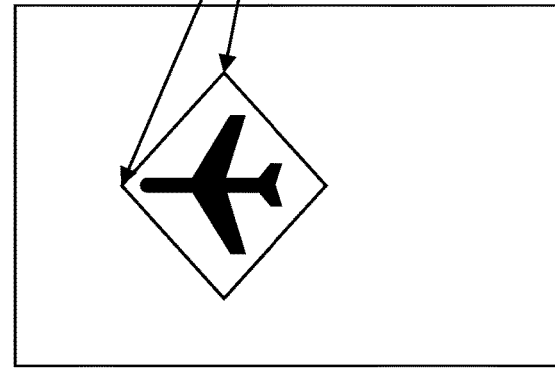

FIGS. 8A-8B show examples of 4-parameter affine model 800 and 6-parameter affine model 802, in accordance with various aspects of the disclosure. In HEVC, only translation motion model is applied for motion compensation prediction (MCP). While in the real world, there are many kinds of motion, e.g. zoom in/out, rotation, perspective motions and the other irregular motions. In VVC, a simplified affine transform motion compensation prediction is applied with 4-parameter affine model and 6-parameter affine model. As shown FIGS. 8A-8B, the affine motion field of the block is described by two control point motion vectors (CPMVs) for the 4-parameter affine model and 3 CPMVs for the 6-parameter affine model.

The motion vector field (MVF) of a block is described by the following equations with the 4-parameter affine model (wherein the 4-parameter are defined as the variables a, b, e and f) in equation 16 and 6-parameter affine model (wherein the 4-parameter are defined as the variables a, b, c, d, e and f) in equation 17 respectively:

$$\begin{cases} mv^h(x, y) = ax - by + e = \frac{(mv_1^h - mv_0^h)}{w}x - \frac{(mv_1^v - mv_0^v)}{w}y + mv_0^h \\ mv^v(x, y) = bx + ay + f = \frac{(mv_1^v - mv_0^v)}{w}x + \frac{(mv_1^h - mv_0^h)}{w}y + mv_0^v \end{cases} \quad \text{(eq. 1)}$$

$$\begin{cases} mv^h(x, y) = ax + cy + e = \frac{(mv_1^h - mv_0^h)}{w}x + \frac{(mv_2^h - mv_0^h)}{h}y + mv_0^h \\ mv^v(x, y) = bx + dy + f = \frac{(mv_1^v - mv_0^v)}{w}x + \frac{(mv_2^v - mv_0^v)}{h}y + mv_0^v \end{cases} \quad \text{(eq. 2)}$$

Where (mvh0, mvh0) is motion vector of the top-left corner control point, and (mvh1, mvh1) is motion vector of the top-right corner control point and (mvh2, mvh2) is motion vector of the bottom-left corner control point, all of the three motion vectors are called control point motion vectors (CPMV), (x, y) represents the coordinate of a representative point relative to the top-left sample within current block and (mvh(x,y), mvv(x,y)) is the motion vector derived for a sample located at (x, y). The CP motion vectors may be signaled (like in the affine AMVP mode) or derived on-the-fly (like in the affine merge mode). In some aspects, w and h are the width and height of the current block, respectively. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2). For each sub-block (i.e., 4×4 in VTM), the representative point is utilized to derive the motion vector for the whole sub-block.

Figure 9:
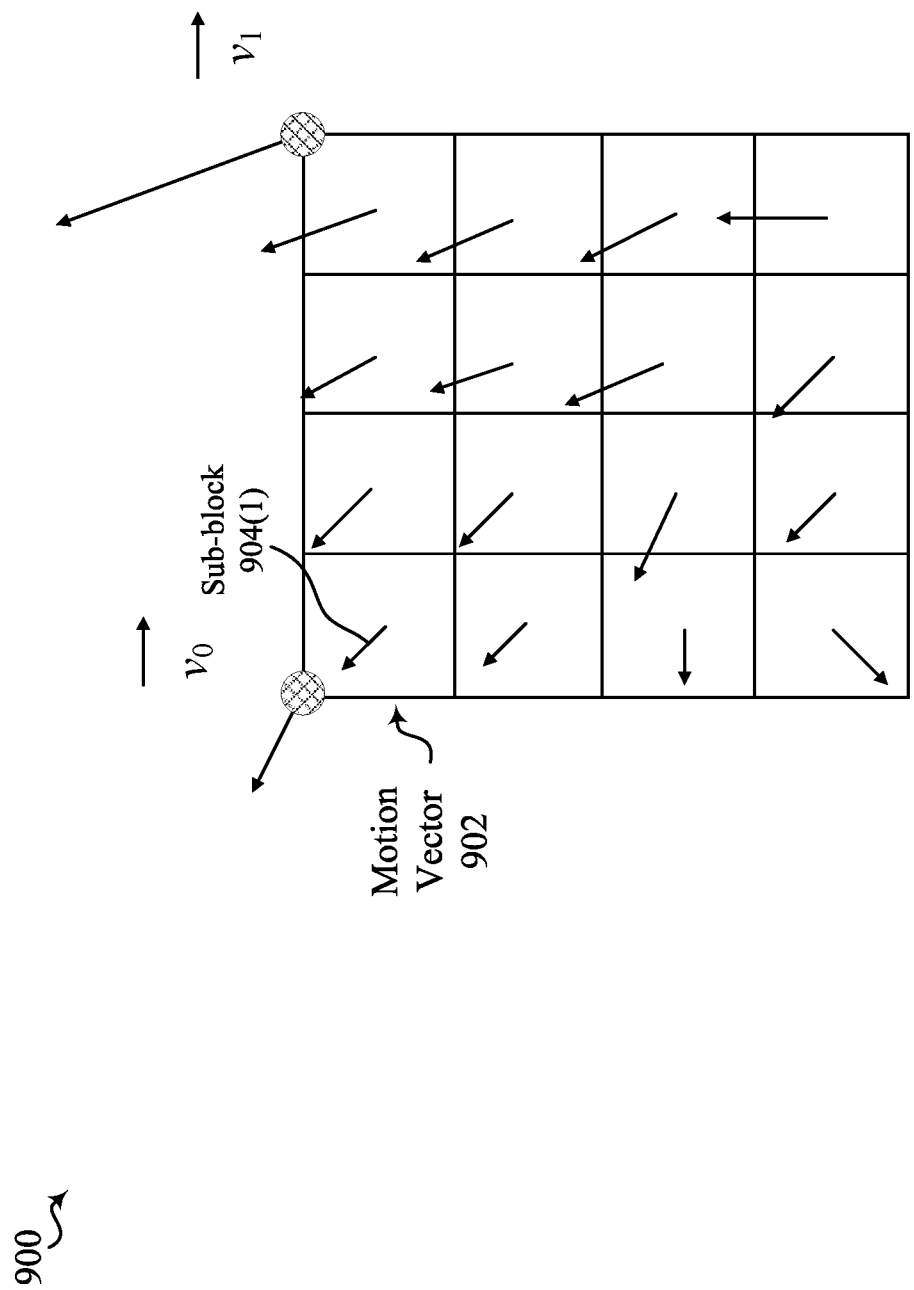
FIG. 9 is a diagram that illustrates an example of affine MVF per sub block, in accordance with various aspects of the disclosure.

In order to further simplify the motion compensation prediction, sub-block based affine transform prediction is applied. To derive motion vector of each M×N (both M and N are set to 4 in current VVC) sub-block, the motion vector 902 of the center sample of each sub-block 904, as shown in FIG. 9, is calculated according to Equation (1) and (2), and rounded to 1/16 fraction accuracy. Then the motion compensation interpolation filters for 1/16-pel are applied to generate the prediction of each sub-block with derived motion vector. The interpolation filters for 1/16-pel are introduced by the affine mode.

Figure 10:
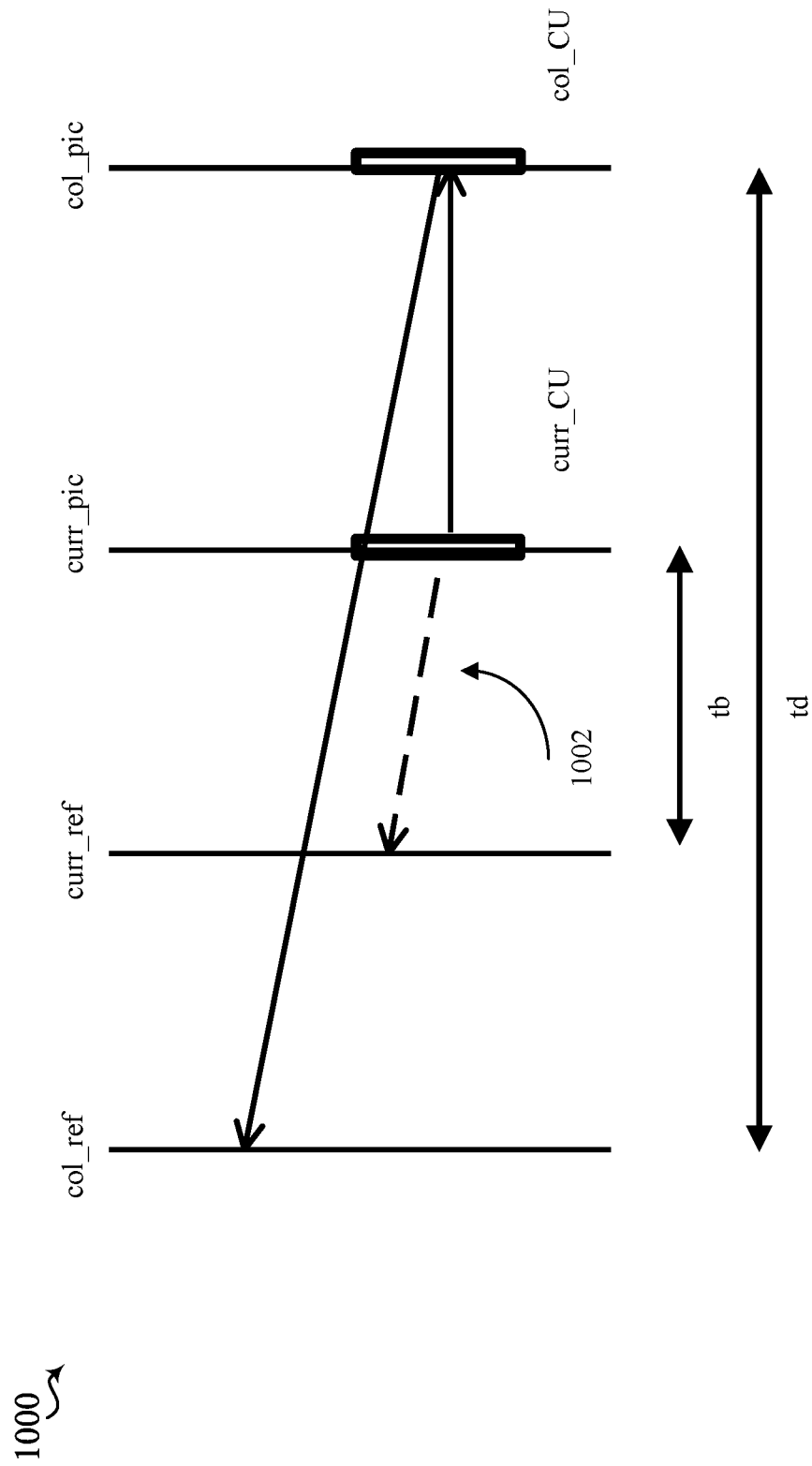
FIG. 10 is a diagram that illustrates an example of motion vector scaling for a temporal merge candidate, in accordance with various aspects of the disclosure.

FIG. 10 is a diagram 1000 that illustrates an example of candidate positions for temporal merge candidate, in accordance with various aspects of the disclosure. In some aspects, a video coder may implement a temporal motion vector prediction (TMVP) process that employs a motion vector in the previous coded frame to predict the current motion vector. Particularly, in the derivation of this temporal candidate, a scaled motion vector is derived based on co-located CU belonging to the collocated reference picture. The reference picture list to be used for derivation of the co-located CU is explicitly signaled in the slice header.

The scaled motion vector for temporal merge candidate 1002 is obtained as illustrated by the dotted line in FIG. 10, which is scaled from the motion vector of the co-located CU using the POC distances, tb and td, where tb is defined to be the POC difference between the reference picture of the current picture and the current picture, and td is defined to be the POC difference between the reference picture of the co-located picture and the co-located picture. The reference picture index of temporal merge candidate is set equal to zero.

Figure 11:
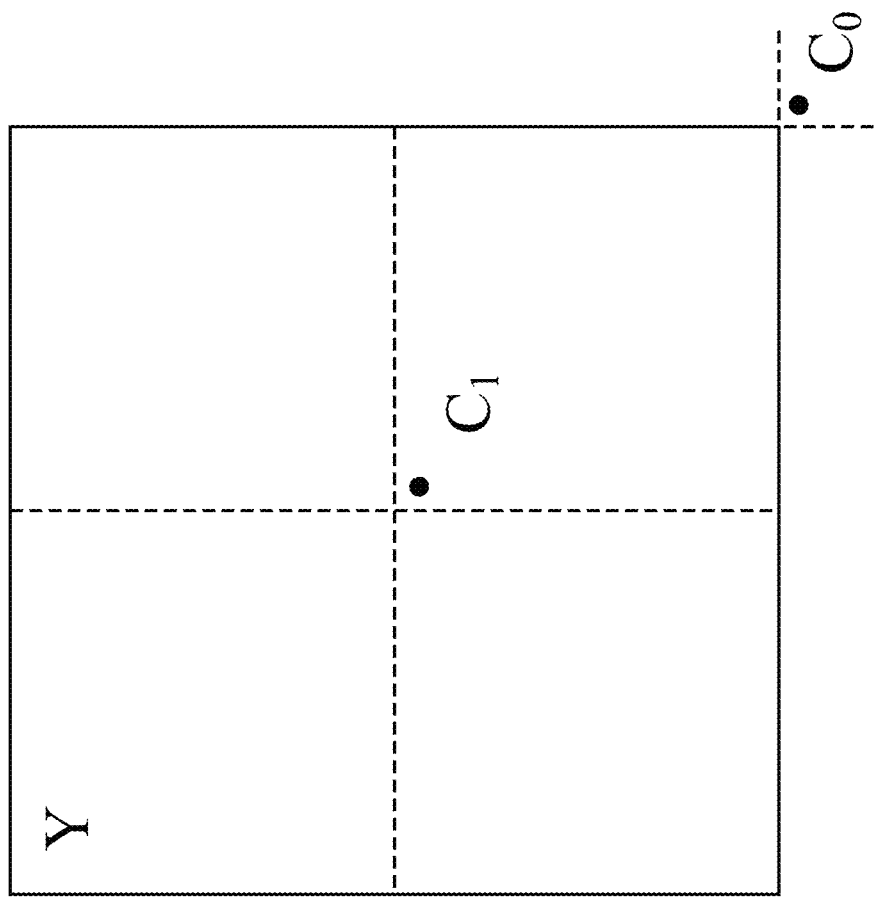
FIG. 11 is a diagram that illustrates an example of candidate positions for temporal merge candidates, in accordance with various aspects of the disclosure.

Further, as illustrated in diagram 1100 of FIG. 11, the position for the temporal candidate is selected between candidates C0 and C1. If CU at position C0 is not available, is intra coded, or is outside of the current row of CTUs, position C1 is used. Otherwise, position C0 is used in the derivation of the temporal merge candidate.

Figure 12:
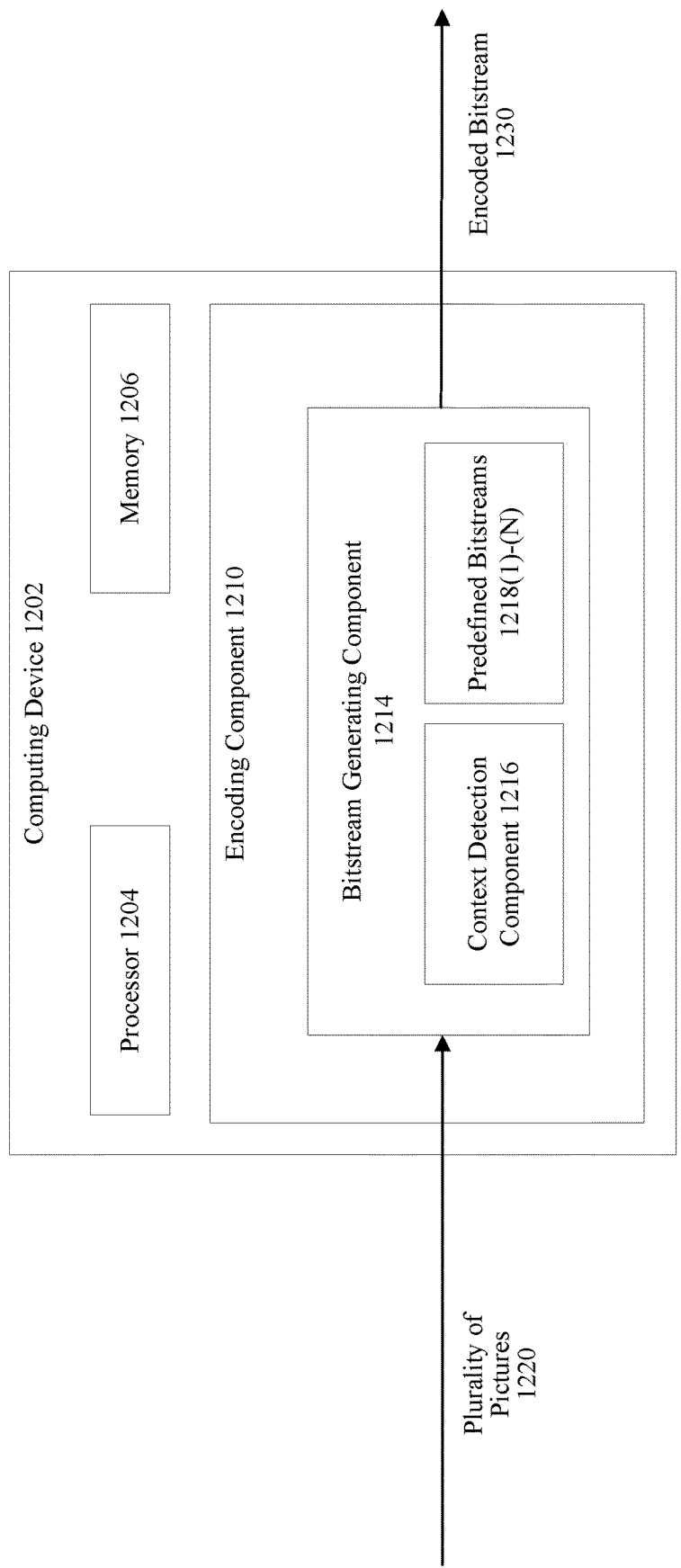
FIG. 12 is a diagram that illustrates a first computing device, in accordance with various aspects of the disclosure.
Figure 13:
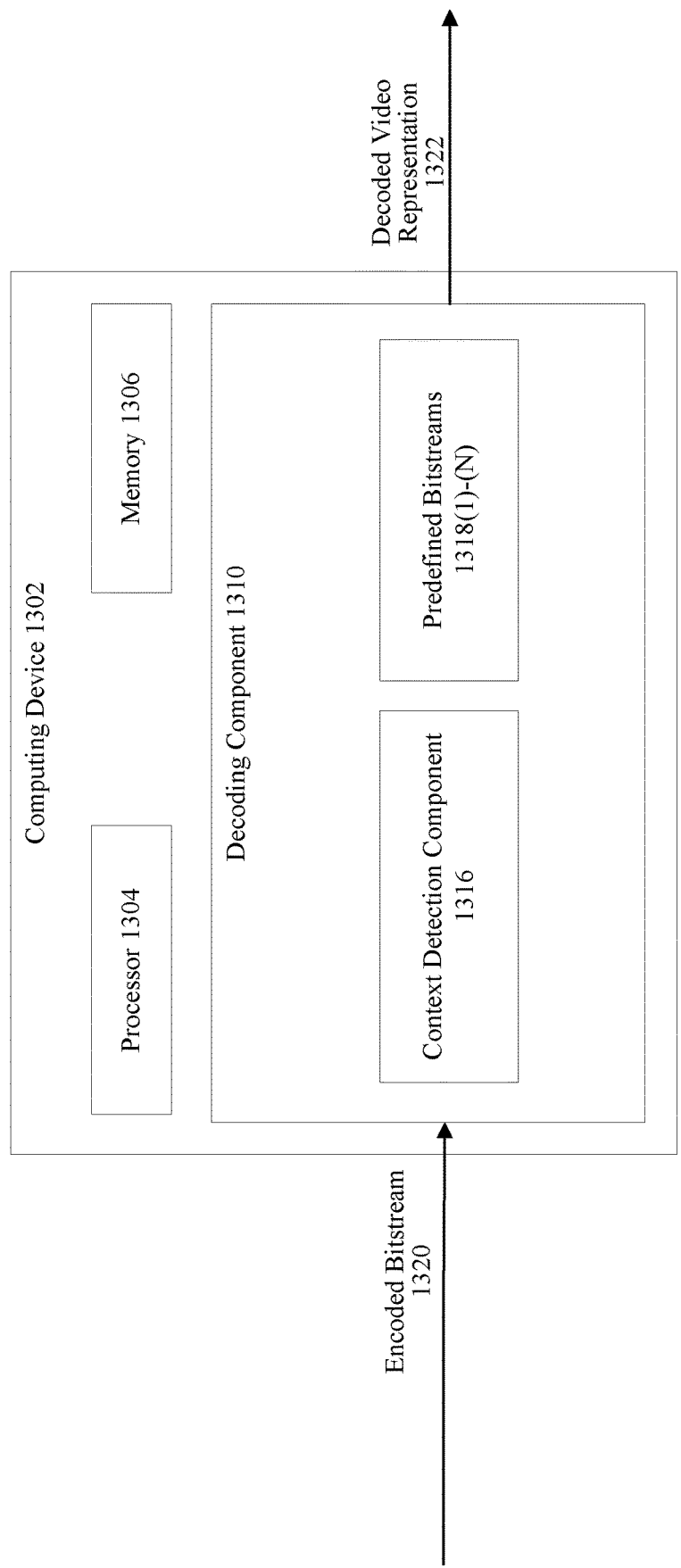
FIG. 13 is a diagram that illustrates a second computing device, in accordance with various aspects of the disclosure.

Referring to FIGS. 12-14, in operation, computing device 1302 may perform a method 1300 of video processing, via execution of decoding component 1310 by processor 1304 and/or memory 1306, video decoder 124, video decoder 300, or HEVC video encoder and decoder 400. In addition, computing device 1202 may perform the method 1300 of video processing, via execution of encoding component 1210 by processor 1304 and/or memory 1306, video encoder 114, or HEVC video encoder and decoder 400.

At block 1402, the method 1300 includes performing a conversion between a current video unit of a video and a bitstream of the video according to a rule; wherein the rule specifies performing the conversion based on a predefined bitstream, wherein the rule specifies to performing the conversion based on a constrained resource context. For instance, in an aspect, the computing device 1202, the processor 1204, the memory 1206, the encoding component 1210, the bitstream generating component 1214, and/or the context detection component 1216 may be configured to or may comprise means for performing a conversion between a current video unit of a video and a bitstream of the video according to a rule; wherein the rule specifies performing the conversion based on a predefined bitstream, wherein the rule specifies to performing the conversion based on a constrained resource context. As another instance, in an aspect, the computing device 1302, the computing device 1302, the processor 1304, the memory 1306, the decoding component 1310, and/or the context detection component 1312 may be configured to or may comprise means for performing a conversion between a current video unit of a video and a bitstream of the video according to a rule; wherein the rule specifies performing the conversion based on a predefined bitstream, wherein the rule specifies to performing the conversion based on a constrained resource context.

In some aspects, bitstream generating component 1214 may encode the plurality of pictures 1220 to generate the encoded bitstream 1230. Further, while the bitstream generating component 1214 is generating a portion of the encoded bitstream 1230 from a video unit of the plurality of pictures 1220, the context detection component 1216 may detect a constrained resource context. Some examples of a video unit may include a block, picture, sub-picture, tile, slice, CTU, VPDU, CTU row, CU, or PU. Further, in some aspects, a constrained resource context may correspond to at least one of a video resolution used during the encoding process performed by the encoding component 1210 being below a predefined threshold, a bitrate of the encoding process performed by the encoding component 1210 being below a predefined threshold, and/or an encoding time of the encoding process performed by the encoding component 1210 being below predefined threshold. Additionally, the context detection component 1216 may detect the constrained resource context based on one or more attributes of the resources of the computing device 1202, e.g., the processor 1204, the memory 1206, etc. For example, in some aspects, a constrained resource context may correspond to an amount of available memory resources of the memory 1206 being below a predefined threshold.

Further, the bitstream generating component 1214 may determine the predefined bitstream 1218 by applying an encoding rule during the generation of a portion of the encoded bitstream 1230 corresponding to the video unit.

As an example, the bitstream generating component 1214 may generate the predefined bitstream 1218 for a video unit with the restriction (i.e., encoding rule) that a plurality of samples (e.g., all samples in the video unit, all inter-coded samples in the current video unit, etc.) utilize the same prediction mode, e.g., inter prediction mode. In some other aspects, the bitstream generating component 1214 may generate the predefined bitstream 1218 for a video unit with the restriction that a plurality of samples (e.g., all samples in the video unit, all inter-coded samples in the current video unit, etc.) choose skip mode. In some other aspects, the bitstream generating component 1214 may generate the predefined bitstream 1218 for a video unit with the restriction that a plurality of samples (e.g., all samples in the video unit, all inter-coded samples in the current video unit, etc.) choose merge mode. In some other aspects, the bitstream generating component 1214 may generate the predefined bitstream 1218 for a video unit with the restriction that a plurality of samples (e.g., all samples in the video unit, all inter-coded samples in the current video unit, etc.) choose the same merge candidate index except the first coding block/prediction block in the video unit. In yet still some other aspects, the bitstream generating component 1214 may generate the predefined bitstream 1218 for a video unit with the restriction that a plurality of samples (e.g., all samples in the video unit, all inter-coded samples in the current video unit, etc.) choose the same merge candidate index, such as being equal to 0 or 1. In some instances, a sample may correspond to an inter-coded sample.

In some aspects, the bitstream generating component 1214 may generate the predefined bitstream 1218 for a video unit with the restriction that a plurality of coding units (e.g., all CUs within the video unit) share the same size. Further, in some examples, the size of the CUs may be set to the maximum CTU.

In some aspects, the bitstream generating component 1214 may generate the predefined bitstream 1218 for a video unit by disabling a tool for a plurality of samples (e.g., all samples in the video unit). In some instances, the disabled tool may include one or more filtering methods, e.g., DBF, SAO, ALF, CC-ALF, LMCS, etc. Additionally, or alternatively, the disabled tool may include a TMVP.

In some aspects, the bitstream generating component 1214 may generate the predefined bitstream 1218 for a video unit by setting a merge candidate with a fixed candidate index equal to K for a first coding unit or first prediction unit to be encoded in the video unit where K does not equal 0. In some examples, K may be set to 1.

In a H.264 codec implementation, the bitstream generating component 1214 may generate the predefined bitstream 1218 for an inter video unit (e.g., inter slice) for a plurality of regions of the current video unit (e.g., all the inter macro-blocks) using a zero motion vector. In some examples, the motion vectors in the inter video unit may point to the same reference picture or the same plurality of reference pictures. Additionally, in some examples, the macro-blocks in the video unit may have no residue. Further, in some examples, the macro-blocks in the video unit may have DBF and/or SAO disabled.

In a H.265 codec implementation, the bitstream generating component 1214 may generate the predefined bitstream 1218 for an inter video unit (e.g., inter slice, or tile) for a plurality of regions of the current video unit (e.g., all the inter macro-blocks) using a zero motion vector. In some examples, the motion vectors in the inter video unit may point to the same reference picture or the same plurality of reference pictures. Additionally, in some examples, the macro-blocks in the video unit may have no residue. Further, in some examples, the macro-blocks in the video unit may have DBF and/or SAO disabled.

In a H.266 codec implementation, the bitstream generating component 1214 may generate the predefined bitstream 1218 for an inter video unit (e.g., inter slice, tile, sub-picture) for a plurality of regions of the current video unit (e.g., all the inter macro-blocks) using a zero motion vector. In some examples, the motion vectors in the inter video unit may point to the same reference picture or the same plurality of reference pictures. Additionally, in some examples, the macro-blocks in the video unit may have no residue. Further, in some examples, the macro-blocks in the video unit may have DBF, SAO, ALF, color component ALF, cross-component adaptive loop filter, and/or reference picture resampling disabled.

In some aspects, the bitstream generating component 1214 may generate or identify the predefined bitstream 1218 for a video unit by copying that inter video units (e.g., inter slice) from a collocated picture or the nearest picture. In some aspects, e.g., bi-directional prediction, the nearest picture may be defined as the nearest forward picture or the nearest backward picture.

In some aspects, a predefined bitstream 1218 corresponding to a video unit may be generated before the encoding of the video unit, and the bitstream generating component 1214 may identify the pre-existing predefined bitstream 1218. As an example, in some aspects, the bitstream generating component 1214 may generate the predefined bitstream 1218 using a fixed QP being equal to K. Further, K may be set to the maximum allowed QP value for the video codec or coding standard applied by the encoding component 1210, e.g., 51 for the H.264 or H.265 coding standards, 63 for H.266 coding standard, etc. As another example, in some aspects, the bitstream generating component 1214 may generate or identify a predefined bitstream 1218 to employ in the encoding process based on a resolution associated with the encoding process. For example, the bitstream generating component 1214 may generate or identify a first predefined bitstream 1218(1) based on a first resolution, and generate or identify a second predefined bitstream 1218(2) based on a second resolution. Additionally, or alternatively, the bitstream generating component 1214 may generate or identify a predefined bitstream 1218 to employ in the encoding process based on the particular picture being encoded within the encoding process. For example, the bitstream generating component 1214 may generate or identify a first predefined bitstream 1218(1) based on a picture 1220(1), and generate or identify a second predefined bitstream 1218(2) based on a second picture 1220(2).

In some aspects, the bitstream generating component 1214 may generate or identify a predefined bitstream 1218 based upon a session. For example, a first session may be associated with a first predefined bitstream 1218(1), and a second session may be associated with a second predefined bitstream 1218(2). As used herein, in some aspects, a "session" may refer to one or more continuous tiles, one or more continuous slices, and/or one or more continuous pictures.

Additionally, the computing device may 1202 may encode the plurality of pictures 1220(1)-(N) to generate the encoded bitstream 1230. Further, the encoding component 1210 may employ a predefined bitstream 1218 for a portion of the encoded bitstream 1230 in response to the constrained resource context. In particular, the portion of the encoded bitstream 1230 corresponding to the encoded representation of a video unit may be the predefined bitstream 1212(1). As another example, the computing device 1302 may decode the encoded bitstream 1320 to generate the decoded video representation 1322(1)-(N). Additionally, the decoding component 1310 may employ a predefined bitstream 1318(1) for decoding a portion of the encoded bitstream 1320 in response to the constrained resource context. In particular, when determining the decoded video representation 1322, a predefined bitstream 1318(1) may be used to supplement a portion of the encoded bitstream 1320. As described herein, use of the predefined bitstream 1218 or the predefined bitstream 1318 may provide coding efficiency gains during constrained resource contexts.

In some example bitstreams, a sps_temporal_mvp_enabled_flag_equal to 1 may specify that temporal motion vector predictors are enabled for a coded layer-wise video sequence (CLVS). As used herein, CLVS, may refer to a sequence of pictures and the associated data, not related to the pictures, that are required to describe the video sequence (e.g., size of the pictures, frame rate of the video, bit-depth of the picture samples). Further, a sps_temporal_mvp_enabled_flag equal to 0 specifies that temporal motion vector predictors are disabled for the CLVS. In some aspects, the sps_temporal_mvp_enabled_flag shall be inferred to be equal to 0 in the pre-defined bitstream.

In some example bitstreams, a general_merge_flag[x0][y0] specifies whether the inter prediction parameters for the current coding unit are inferred from a neighboring inter-predicted partition. The array indices x0, y0 specify the location (x0, y0) of the top-left luma sample of the considered coding block relative to the top-left luma sample of the picture. In some aspects, the general_merge_flag[x0][y0] shall be inferred to be equal to 1 in the pre-defined bitstream.

In some example bitstreams, a merge_idx[x0][y0] specifies the merging candidate index of the merging candidate list where x0, y0 specify the location (x0, y0) of the top-left luma sample of the considered coding block relative to the top-left luma sample of the picture. When merge_idx[x0][y0] is not present, it is inferred as follows: If mmvd_merge_flag[x0][y0] is equal to 1, merge_idx[x0][y0] is inferred to be equal to mmvd_cand_flag[x0][y0]. Otherwise (mmvd_merge_flag[x0][y0] is equal to 0), merge_idx[x0][y0] is inferred to be equal to 0. In some aspects, the merge_idx[x0][y0] shall be inferred to be equal to 0 in the pre-defined bitstream.

The detailed inventions below should be considered as examples to explain general concepts. These inventions should not be interpreted in a narrow way. Furthermore, these inventions can be combined in any manner.

It is proposed to add a restriction that all samples in one video unit (e.g., a slice/tile/CTU row) may utilize the same prediction mode, e.g., inter prediction mode.

Alternatively, furthermore, it is restricted that all samples in the video unit (e.g., a slice/tile/CTU row) may choose skip mode.

Alternatively, furthermore, it is restricted that all samples in the video unit (e.g., a slice/tile/CTU row) may choose merge mode.

Alternatively, furthermore, it is restricted that all samples in the video unit (e.g., a slice/tile/CTU row) may choose the same merge candidate index except the first coding block/prediction block in the video unit (e.g., a slice/tile/CTU row).

Alternatively, furthermore, it is restricted that all samples in the video unit (e.g., a slice/tile/CTU row) may choose the same merge candidate index, such as being equal to 0 or 1.

Alternatively, furthermore, the above mentioned 'all samples' may be replaced by 'all inter-coded samples'.

It is proposed to add a restriction that all CUs within one video unit (e.g., a slice/tile/CTU row) share the same size.

In one example, the size is set to the maximum CTU.

It is proposed to always disable a certain tool for all samples in one video unit (e.g., a slice/tile/CTU row).

Alternatively, furthermore, the certain tool includes the filtering methods (e.g., deblocking filter, SAO, ALF, CC-ALF, LMCS).

Alternatively, furthermore, the certain tool includes the temporal motion vector prediction.

It is proposed the first coding unit/prediction unit to be coded/decoded in a video unit (e.g., a slice/tile/CTU row) shall use the merge candidate with a fixed candidate index equal to K wherein K is unequal to 0.

In one example, K is set to 1.

For a H.264 inter video units (e.g., inter slice), it may be suggested that all the inter macro-block should be generated with all zero motion vector.

In one example, all the motion vectors in the video unit should point to the same reference picture.

In one example, all the motion vectors in the video unit should point to the same reference pictures.

In one example, all the macro-blocks in the video unit should have no residue.

In one example, all the macro-blocks in the video unit should have deblocking disabled.

In one example, all the macro-blocks in the video unit should have sample-adaptive offset disabled.

In one example, one or multiple constrains shown above may be met.

For a H.265 inter video units (e.g., inter slice or tile), it may be suggested that all the inter coding unit should be generated with all zero motion vector.

In one example, all the motion vectors in the video unit should point to the same reference picture.

In one example, all the motion vectors in the video unit should point to the same reference pictures.

In one example, all the coding units in the video unit should have no residue.

In one example, all the coding units in the video unit should have deblocking disabled.

In one example, all the coding units in the video unit should have sample-adaptive offset disabled.

In one example, one or multiple constrains shown above may be met.

For a H.266 inter video units (e.g., inter slice or tile or subpicture), it may be suggested that all the inter coding unit should be generated with all zero motion vector.

In one example, all the motion vectors in the video unit should point to the same reference picture.

In one example, all the motion vectors in the video unit should point to the same reference pictures.

In one example, all the coding units in the video unit should have no residue.

In one example, all the coding units in the video unit should have the deblocking disabled.

In one example, all the coding units in the video unit should have the sample-adaptive offset disabled.

In one example, all the coding units in the video unit should have the adaptive loop filter disabled.

In one example, all the coding units in the video unit should have the color component adaptive loop filter disabled.

In one example, reference picture resampling should be disabled.

In one example, one or multiple constrains shown above may be met.

It may be suggested that the inter video units (e.g., inter slice) copies from the collocated picture.

It may be suggested that the inter video units (e.g., inter slice) copies from the nearest picture.

In case of bi-directional prediction, the nearest picture may be defined as the nearest forward picture.

Alternatively, in case of bi-directional prediction, the nearest picture may be defined as the nearest backward picture.

It may be suggested that one or multiple predefined bitstreams, e.g. generated before encoding a video unit (e.g., a slice or picture or sequence or a CTU row), may be generated.

In one example, the predefined bitstream may be generated by a fixed QP being equal to K.

In one example, the K is set to the maximum allowed QP value, e.g., 51 for H.264/H.265, 63 for H.266.

In one example, the predefined bitstream may be based on resolution.

In one example, different resolution may have different predefined bitstream.

In one example, the predefined bitstream may be based on a picture, e.g. one picture may have its own predefined bitstream.

In one example, the predefined bitstream may be used when resource, e.g., encoding time, bitrate, is limited.

In one example, the predefined bitstream may be generated by following rules described in bullets 1-9.

It may be suggested that different sessions of the bitstream may use different predefined bitstreams.

In one example, one session may be defined as one or continuous tiles.

In one example, one session may be defined as one or continuous slices.

In one example, one session may be defined as one or continuous pictures.

In above examples, inter video units may be used to represent a video unit that at least one sample within the video unit is coded with the inter mode.

Embodiment 1

A predefined bitstream may be defined as below.

sps_temporal_mvp_enabled_flag equal to 1 specifies that temporal motion vector predictors are enabled for the CLVS. sps_temporal_mvp_enabled_flag equal to 0 specifies that temporal motion vector predictors are disabled for the CLVS. The sps_temporal_mvp_enabled_flag shall be inferred to be equal to 0 in the pre-defined bitstream.

general_merge_flag[x0][y0] specifies whether the inter prediction parameters for the current coding unit are inferred from a neighboring inter-predicted partition. The array indices x0, y0 specify the location (x0, y0) of the top-left luma sample of the considered coding block relative to the top-left luma sample of the picture. The general_merge_flag[x0][y0] shall be inferred to be equal to 1 in the pre-defined bitstream.

merge_idx[x0][y0] specifies the merging candidate index of the merging candidate list where x0, y0 specify the location (x0, y0) of the top-left luma sample of the considered coding block relative to the top-left luma sample of the picture.

When merge_idx[x0][y0] is not present, it is inferred as follows:

If mmvd_merge_flag[x0][y0] is equal to 1, merge_idx[x0][y0] is inferred to be equal to mmvd_cand_flag[x0][y0].

Otherwise (mmvd_merge_flag[x0][y0] is equal to 0), merge_idx[x0][y0] is inferred to be equal to 0.

The merge_idx[x0][y0] shall be inferred to be equal to 0 in the pre-defined bitstream.

Embodiment 2

For HEVC, when the previous pictures are all P pictures, there is a new picture coming in and the resource is limited. Then the following may apply: For a fixed W×H picture, a pre-defined bitstream is prepared as follows. First of all, the partitioning information is to divide 64×64 blocks until it reaches the boundary. Second, all block CBFs are set as 0.

Example Solutions

A listing of solutions preferred by some embodiments is provided next.

1. A method for video processing, comprising: performing a conversion between a current video unit of a video and a bitstream of the video according to a rule; wherein the rule specifies to performing the conversion based on a constrained context.

2. The method of solution 1, wherein the constrained context includes a bitrate or an encoding time below a predefined threshold.

3. The method of solution 1 or solution 2, wherein the constrained context includes an available memory resource below a predefined threshold.

4. The method of any of solutions 1-3, wherein the constrained context includes restricting a plurality of samples within the current video unit to a same prediction mode.

5. The method of solution 4, wherein the plurality of samples include all samples in the current video unit, or all inter-coded samples in the current video unit.

6. The method of solution 4 or solution 5, wherein the prediction mode includes at least one of a inter prediction mode, a skip mode, a merge mode, using a same merge candidate index except a first coding block/a first prediction block in the current video unit, or using a same merge candidate index (such as being equal to 0 or 1).

7. The method of any of solutions 1-6, wherein the constrained context includes restricting a plurality of coding units within the current video unit to a same size.

8. The method of solution 7, wherein the size is set to a maximum size of a coding tree unit (CTU).

9. The method of any of solutions 1-8, wherein the constrained context includes disabling application of a tool to a plurality of samples within the current video unit.

10. The method of solution 9, wherein the tool includes at least one of a filtering method or a temporal motion vector prediction.

11. The method of solution 10, wherein the filtering method includes at least one of a deblocking filter, a sample adaptive offset (SAO), an adaptive loop filter (ALF), a cross-component adaptive loop filter (CC-ALF), a luma mapping with chroma scaling (LMCS).

12. The method of any of solutions 1-11, wherein the constrained context includes setting a merge candidate of a first coding block and/or a first prediction block of the current video unit to a fixed candidate index that does not equal 0.

13. The method of solution 12, wherein the fixed candidate index is set to 1.

14. The method of any of solutions 1-13, wherein in response to the current video unit being an inter video unit, the constrained context includes using a zero motion vector for a plurality of regions of the current video unit.

15. The method of solution 14, wherein all motion vectors in the current video unit point to one or more same reference pictures.

16. The method of solution 14 or solution 15, wherein all coding units in the current video unit satisfy at least one of having no residue, having a deblocking disabled, having a sample adaptive offset disabled, having an adaptive loop filter disabled, having a cross-component adaptive loop filter disabled, having reference picture resampling disabled.

17. The method of any of solutions 1-16, wherein in response to the current video unit being an inter video unit, the constrained context includes copying a collocated picture or a nearest picture for the current video unit.

18. The method of any of solutions 1-17, wherein the method further comprises before performing the conversion, determining the constrained context and determining a predefined bitstream in response to the constrained context; and wherein performing the conversion comprises performing the conversion based on the predefined bitstream.

19. The method of solution 18, wherein the predefined bitstream is based on a fixed quantization parameter being equal to K, and wherein K is an integer.

20. The method of solution 19, wherein K is set to a maximum allowed value of quantization parameter.

21. The method of solution 20, wherein K is set to 51 or 63.

22. The method of any of solutions 1-21, wherein the predefined bitstream is used based on a current resolution value and another predefined bitstream is used for another resolution value.

23. The method of any of solutions 1-22, wherein the predefined bitstream is used for a session and another predefined bitstream is used for another session.

24. The method of solution 23, wherein the session is defined as one or more continuous tiles, or one or more continuous slices, or one or more continuous pictures.

25. The method of any of solutions 1-24, wherein the conversion includes encoding the current video unit into the bitstream.

26. The method of any of solutions 1-24, wherein the conversion includes decoding the current video unit from the bitstream.

27. The method of any of solutions 1-24, wherein the conversion includes generating a bitstream of the video; and the method further comprises storing the bitstream in a non-transitory computer-readable recording medium.

28. An apparatus for processing video data comprising a processor and a non-transitory memory with instructions thereon, wherein the instructions upon execution by the processor, cause the processor to: perform a conversion between a current video unit of a video and a bitstream of the video according to a rule; wherein the rule specifies to performing the conversion based on a constrained context.

29. A video decoding apparatus comprising a processor configured to implement a method recited in one or more of solutions 1 to 27.

30. A video encoding apparatus comprising a processor configured to implement a method recited in one or more of solutions 1 to 27.

31. A non-transitory computer-readable storage medium storing instructions that cause a processor to: perform a conversion between a current video unit of a video and a bitstream of the video according to a rule; wherein the rule specifies to performing the conversion based on a constrained context.

32. A computer program product having computer code stored thereon, the code, when executed by a processor, causes the processor to implement a method recited in any of solutions 1 to 27.

33. A non-transitory computer-readable recording medium storing a bitstream of a video which is generated by a method performed by a video processing apparatus, wherein the method comprises: generating the bitstream of the video based on a current video unit of the video according to a rule; wherein the rule specifies to generating the bitstream based on a constrained context.

A method, apparatus or system described in the present document.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The previous description is provided to enable any person having ordinary skill in the art to practice the various aspects described herein. Various modifications to these aspects will be readily apparent to a person having ordinary skill in the art, and the generic principles defined herein may be applied to other aspects. The claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to a person having ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for video processing, comprising:
   performing a conversion between a current video unit of a video and a bitstream of the video based on a constrained resource according to a rule;
   wherein the rule specifies a combination of the following:
   a same prediction mode for a plurality of samples within the current video unit,
   a same merge candidate index for the plurality of samples within the current video unit, wherein the same merge candidate index comprises 0 or 1, and
   a temporal motion vector prediction for the plurality of samples within the current video unit being disabled, and
   wherein the constrained resource comprises at least one of the following:
   a bitrate being below a first predefined threshold,
   an available memory resource being below a second predefined threshold, and
   an encoding time length being below a third predefined threshold.

2. The method of claim 1, wherein the plurality of samples include all samples in the current video unit, or all inter-coded samples in the current video unit.

3. The method of claim 1, wherein the prediction mode includes at least one of an inter prediction mode, a skip mode, or a merge mode.

4. The method of claim 1, wherein the rule further specifies: restricting a plurality of coding units within the current video unit to a same size.

5. The method of claim 1, wherein the rule further specifies: disabling a filtering method for the plurality of samples within the current video unit.

6. The method of claim 5, wherein the filtering method includes at least one of the following: a deblocking filter, a sample adaptive offset (SAO), an adaptive loop filter (ALF), a cross-component adaptive loop filter (CC-ALF), a luma mapping with chroma scaling (LMCS).

7. The method of claim 1, wherein in response to the current video unit being an inter video unit, the rule further specifies: using a zero motion vector for a plurality of regions of the current video unit.

8. The method of claim 7, wherein all motion vectors in the current video unit point to one or more same reference pictures, and/or all coding units in the current video unit satisfy at least one of having no residue, having a deblocking disabled, having a sample adaptive offset disabled, having an adaptive loop filter disabled, having a cross-component adaptive loop filter disabled, having reference picture resampling disabled.

9. The method of claim 1, wherein in response to the current video unit being an inter video unit, the rule further specifies: copying a collocated picture or a nearest picture for the current video unit.

10. The method of claim 1, wherein the conversion includes encoding the current video unit into the bitstream.

11. The method of claim 1, wherein the conversion includes decoding the current video unit from the bitstream.

12. An apparatus for processing video data comprising a processor and a non-transitory memory with instructions thereon, wherein the instructions upon execution by the processor, cause the processor to:
  perform a conversion between a current video unit of a video and a bitstream of the video based on a constrained resource according to a rule;
  wherein the rule specifies a combination of the following:
    a same prediction mode for a plurality of samples within the current video unit,
    a same merge candidate index for the plurality of samples within the current video unit, wherein the same merge candidate index comprises 0 or 1, and
    a temporal motion vector prediction for the plurality of samples within the current video unit being disabled, and
  wherein the constrained resource comprises at least one of the following:
    a bitrate being below a first predefined threshold,
    an available memory resource being below a second predefined threshold, and
    an encoding time length being below a third predefined threshold.

13. A non-transitory computer-readable storage medium storing instructions that cause a processor to:
  perform a conversion between a current video unit of a video and a bitstream of the video based on a constrained resource according to a rule;
  wherein the rule specifies a combination of the following:
    a same prediction mode for a plurality of samples within the current video unit,
    a same merge candidate index for the plurality of samples within the current video unit, wherein the same merge candidate index comprises 0 or 1, and
    a temporal motion vector prediction for the plurality of samples within the current video unit being disabled, and
  wherein the constrained resource comprises at least one of the following:
    a bitrate being below a first predefined threshold,
    an available memory resource being below a second predefined threshold, and
    an encoding time length being below a third predefined threshold.

14. A non-transitory computer-readable recording medium storing computer executable program, when executed by a video processing apparatus, cause the video processing apparatus to perform a method comprising:
  generating a bitstream of the video based on a current video unit of the video based on a constrained resource according to a rule by performing a conversion;
  wherein the rule specifies a combination of the following:
    a same prediction mode for a plurality of samples within the current video unit,
    a same merge candidate index for the plurality of samples within the current video unit, wherein the same merge candidate index comprises 0 or 1, and
    a temporal motion vector prediction for the plurality of samples within the current video unit being disabled, and
  wherein the constrained resource comprises at least one of the following:
    a bitrate being below a first predefined threshold,
    an available memory resource being below a second predefined threshold, and
    an encoding time length being below a third predefined threshold.

15. The method of claim 10, further comprising:
  generating a predefined stream in response to the constrained resource based on at least one of the following: a fixed quantization parameter (QP), a resolution value, or a picture.

16. The method of claim 15, wherein the fixed quantization parameter equals to K, and wherein K is an integer.

17. The method of claim 15, wherein the predefined stream is used for a session which is defined as: one or more continuous tiles, one or more continuous slices, or one or more continuous pictures.

\* \* \* \* \*